(12) United States Patent
Kaise

(10) Patent No.: US 8,334,937 B2
(45) Date of Patent: Dec. 18, 2012

(54) LIQUID CRYSTAL PROJECTOR AND IMAGE REPRODUCING DEVICE

(75) Inventor: Kikuo Kaise, Kanagawa (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 12/295,911

(22) PCT Filed: Apr. 10, 2007

(86) PCT No.: PCT/JP2007/057889
§ 371 (c)(1),
(2), (4) Date: Oct. 3, 2008

(87) PCT Pub. No.: WO2007/123024
PCT Pub. Date: Nov. 1, 2007

(65) Prior Publication Data
US 2009/0161033 A1    Jun. 25, 2009

(30) Foreign Application Priority Data

Apr. 12, 2006  (JP) .................................. 2006-109938

(51) Int. Cl.
*G02F 1/1335* (2006.01)
(52) U.S. Cl. ........................................... 349/8
(58) Field of Classification Search ........................ 349/8
See application file for complete search history.

(56) References Cited

U.S. PATENT DOCUMENTS

| 4,753,503 A | 6/1988 | Day et al. |
| 5,161,042 A | 11/1992 | Hamada |
| 5,317,348 A * | 5/1994 | Knize .............................. 353/31 |
| 6,286,961 B1 | 9/2001 | Ogawa |
| 2004/0017518 A1 | 1/2004 | Stern |

(Continued)

FOREIGN PATENT DOCUMENTS

JP          63-118125          5/1988

(Continued)

OTHER PUBLICATIONS

European Search Report corresponding to European Serial No. 07741325.0 dated Jan. 12, 2010.

(Continued)

*Primary Examiner* — Jerry Blevins
(74) *Attorney, Agent, or Firm* — SNR Denton US LLP

(57) ABSTRACT

In order to miniaturize a projector as a whole to such a degree that the projector can be included in a small device such as a portable telephone terminal or the like, a red laser light beam (1R) is diffused and shaped by a diffractive optical element (21R) for red, a green laser light beam (1G) is diffused and shaped by a diffractive optical element (21G) for green, and a blue laser light beam (1B) is diffused and shaped by a diffractive optical element (21B) for blue, so as to be each spread over an entire display area of a liquid crystal display panel (40) and be incident on corresponding pixels of a liquid crystal layer (48). The diffused and shaped laser light beams (2R, 2G, and 2B) are made incident on the liquid crystal display panel (40) via a field lens (31). In the liquid crystal display panel (40), red, green, and blue pixels are formed, and a microlens array is formed in an incidence side substrate (41). The liquid crystal display panel (40) distributes and condenses the laser light of the colors by microlenses, and makes the laser light incident on the corresponding pixels. Refraction type optical elements can be used in place of the diffractive optical elements.

11 Claims, 18 Drawing Sheets

U.S. PATENT DOCUMENTS

| | | | |
|---|---|---|---|
| 2004/0164309 A1* | 8/2004 | Okano et al. | 257/98 |
| 2005/0062903 A1* | 3/2005 | Cok et al. | 349/69 |
| 2005/0128435 A1 | 6/2005 | Yamauchi | |

FOREIGN PATENT DOCUMENTS

| | | | |
|---|---|---|---|
| JP | 4-60538 | | 2/1992 |
| JP | 08-313845 | | 11/1996 |
| JP | HEI 08-313845 A | | 11/1996 |
| JP | 2001-281599 | | 10/2001 |
| JP | 2001281599 A | * | 10/2001 |
| JP | 2004-334081 | | 11/2004 |
| JP | 2004-334081 A | | 11/2004 |
| JP | 2005-115179 | | 4/2005 |
| JP | 2005-116799 | | 4/2005 |
| JP | 2005115179 A | * | 4/2005 |
| JP | 2005-526288 | | 9/2005 |
| JP | 2005-301164 | | 10/2005 |
| JP | 2005-301164 A | | 10/2005 |
| JP | 2006-072220 | | 3/2006 |
| JP | 2006-072220 A | | 3/2006 |
| WO | 94/22050 | | 9/1994 |
| WO | WO94/22050 | | 9/1994 |
| WO | WO 9422050 | * | 9/1994 |
| WO | 96/03676 | | 2/1996 |
| WO | WO96/03676 | | 2/1996 |

OTHER PUBLICATIONS

Japanese Patent Office, Office Action issued in Patent Application JP 2006-109938, on Jan. 18, 2011.

International Search Report corresponding to PCT/JP07/057889 dated May 22, 2007.

EP Communication: Article 94(3) issued on Jan. 31, 2012 in connection with counterpart JP Application No. 07741325.0.

* cited by examiner

FIG. 4
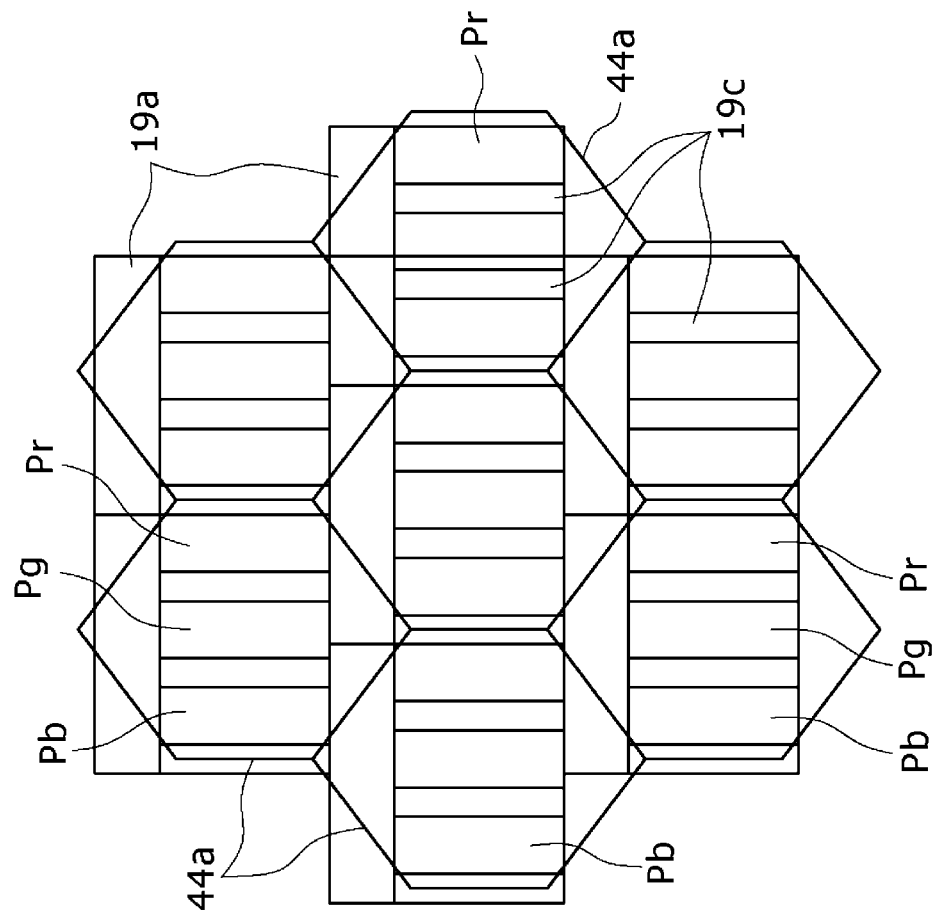
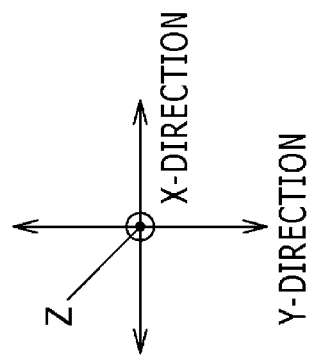

FIG.7
(A)
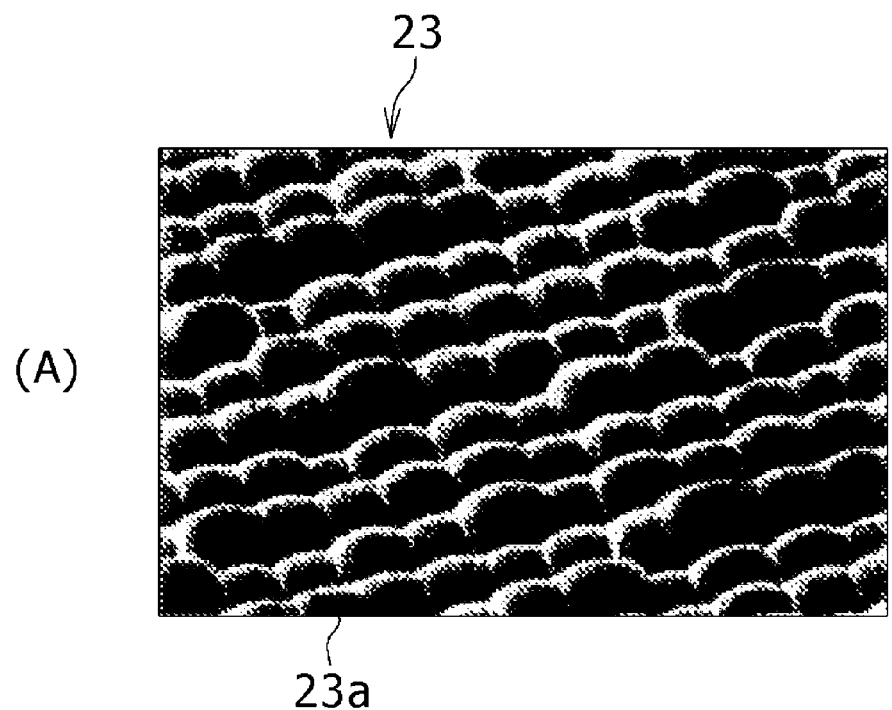
23
23a
(B)
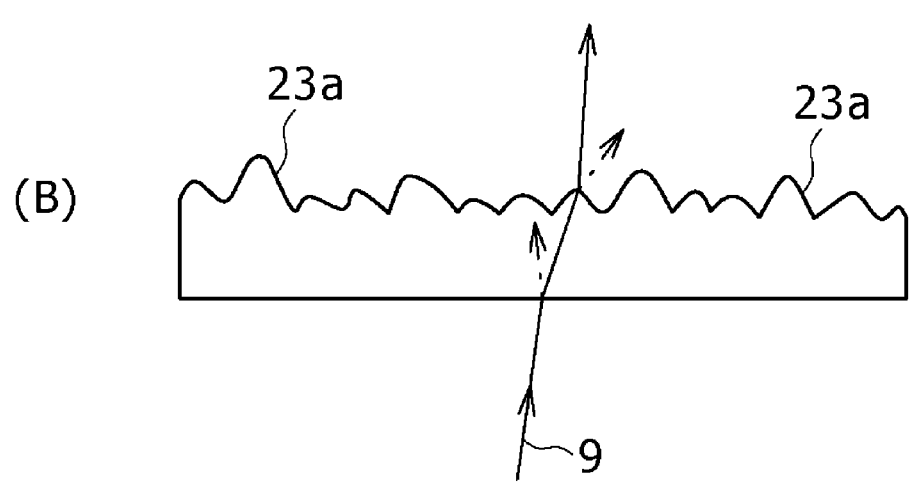
23a
23a
9

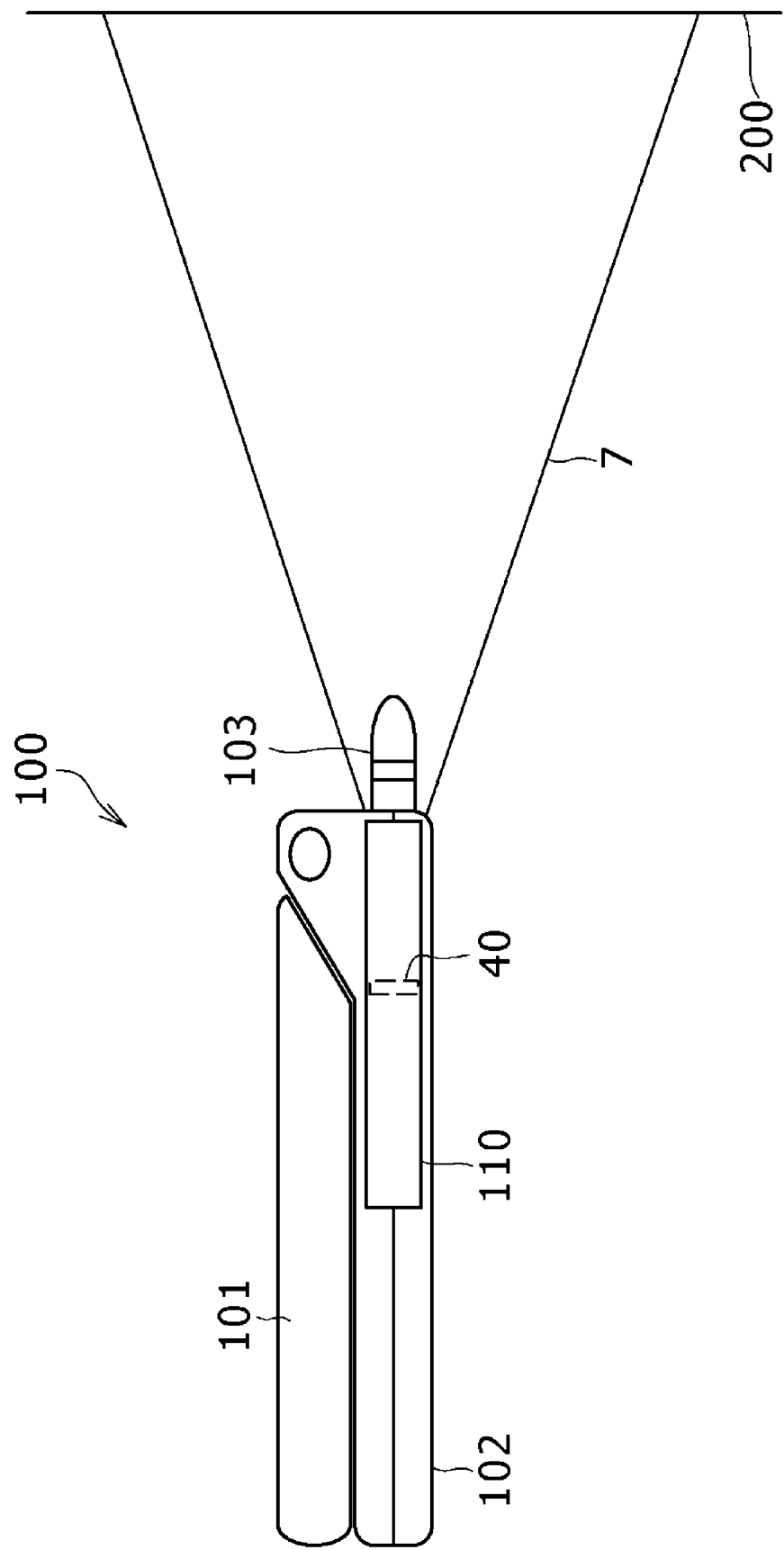

LIQUID CRYSTAL PROJECTOR AND IMAGE REPRODUCING DEVICE

TECHNICAL FIELD

The present invention relates to a projector (projection type display device) using a liquid crystal display panel (liquid crystal display device) as a light valve, and an image reproducing device such as a portable telephone terminal, a digital camera, a video camera, a personal computer, a game machine, a toy and the like.

BACKGROUND ART

A projector is conventionally and generally regarded as a thing to be installed and used within a house or the like. As disclosed in Japanese Patent Laid-open No. 63-118125, Japanese Patent Laid-open No. Hei 4-60538, and the like, a lamp such as a metal halide lamp, a high pressure mercury lamp, a xenon lamp or the like is used as a light source.

However, when a lamp is used as a light source, there are for example problems in that (a) the aperture of a light source unit is increased, resulting in a larger size of the projector as a whole, (b) the light source unit generates a large amount of heat and thus requires a cooling device such as a fan or the like, resulting in an even larger size of the projector as a whole, (c) the fan or the like generates a high level of noise and contributes to an increase in power consumption, (d) light in an undesired and harmful wavelength region such as ultraviolet rays and the like is applied, so that the reliability of a liquid crystal display panel using an organic substance may be impaired, (e) the light source cannot be turned on and off at a high speed, and it is difficult to adjust an amount of light, and (f) frequent lamp replacement is necessary due to the breaking of wire and the life of the lamp.

Therefore, using a light emitting element (illuminant) other than lamps as a light source for a projector is considered.

Specifically, Japanese Patent Laid-open No. 2005-116799 and G. Harbers, M. Keuper, S. Paolini; "Performance of High Power LED Illuminators in Color Sequential Projection Displays", IDW'03 p 1585 to p 1588 disclose that an LED (Light Emitting Diode) is used as a light source.

Further, Japanese Patent Laid-open (Translation of PCT Application) No. 2005-526288 discloses that a laser is used as a light source, the pumping of the laser is controlled for each pixel in a raster pattern, and laser light emitted from the laser is scanned on the raster pattern by a scanner formed of two scanning mirrors to display a two-dimensional image on the raster pattern.

As regards the laser, semiconductor lasers, so-called LDs, and solid-state lasers such as a solid-state laser pumped by a semiconductor laser (DPSSL: Diode Pumped Solid State Laser) and the like have been realized. As for the size thereof, the length of one side of a semiconductor laser can be made to be a few hundred μm, and the length of one side of a nonlinear optical crystal of a solid-state laser in a 100-mW output class can be made to be a few mm.

In addition, as compared with the metal halide lamp or the like, the semiconductor laser or the solid-state laser has a long life, hardly needs replacing, has a high light emission efficiency, generates a small amount of heat, and is easy to cool.

In addition, depending on the type and composition of a crystal, the semiconductor laser or the solid-state laser can be made to emit light of an optimum wavelength for display in each of wavelength regions of red, green, and blue, so that color purity is improved, and light unnecessary for display such as infrared light, ultraviolet light and the like is not emitted.

Further, the semiconductor laser or the solid-state laser can be switched on and off instantaneously, so that an amount of emitted light can be controlled easily.

DISCLOSURE OF INVENTION

As disclosed in Japanese Patent Laid-open No. 2005-116799 and G. Harbers, M. Keuper, S. Paolini; "Performance of High Power LED Illuminators in Color Sequential Projection Displays", IDW'03 p 1585 to p 1588, when an LED is used as a light source for a liquid crystal projector, the light source unit can be miniaturized and the projector as a whole can be miniaturized, as compared with a case of using a lamp as the light source. Even so, the projector as a whole is limited to about a size such that the projector can be put on the "palm of a hand". It is difficult to include the projector in a small device such as a portable telephone terminal or the like.

Moreover, as is pointed out in Japanese Patent Laid-open No. 2005-116799, the angle of divergence of light emitted by the LED is large. When this is used as a light source for a projector, Etendue is too large as compared with the display area of a liquid crystal display panel. As a result, light use efficiency is lowered.

On the other hand, it is possible not only to miniaturize the semiconductor laser or the solid-state laser itself but also to overwhelmingly decrease the angle of divergence of light emitted by the semiconductor laser or the solid-state laser as compared with the LED, so that light use efficiency can be greatly improved.

This is because the laser light source is closer to a point source of light as compared with the LED, so that Etendue is optimized easily, light use efficiency is improved, and as a result, only a small amount of light emitted from the light source is necessary to achieve a same amount of light in a projector as compared with a case of using the LED as the light source.

Consequently, when the laser is used as a light source, a cooling device can be simplified or rendered unnecessary.

However, while as disclosed in Japanese Patent Laid-open (Translation of PCT Application) No. 2005-526288, the method of raster scanning of laser light by a scanner realizes black display by turning off the laser light, it is difficult to entirely prevent the laser light from being emitted (set the amount of light to zero) instantaneously while modulating the laser light at a high speed. As a result, there is a disadvantage of a decrease in image contrast.

It is accordingly a problem of the present invention to be able to miniaturize a projector as a whole to such a degree that the projector can be included in a small device such as a portable telephone terminal or the like, and to be able to achieve an improvement in light use efficiency, which is essential as the projector, and an improvement in image contrast.

A liquid crystal projector according to the present invention for solving the above-described problem and relating to a case of being formed as a single-panel system for three colors of red, green, and blue is characterized by including: a light source unit having a first, a second, and a third laser for emitting a red, a green, and a blue laser light beam, respectively, said first, second, and third lasers being each a semiconductor laser or a solid-state laser; a liquid crystal display panel in which a liquid crystal layer constituting a red, a green, and a blue pixel is formed between an incidence side substrate and an emission side substrate, and a microlens array made of a large number of microlenses is formed in the incidence side substrate; a light beam diffusing and shaping optical element for diffusing and shaping the laser light beams of the respective colors emitted from the light source unit by light diffraction or refraction such that the laser light beams of the respective colors are each spread over an entire display area of the liquid crystal display panel and are incident on corresponding pixels of the liquid crystal layer of the liquid crystal display panel; a lens system for converting the laser light beams of the respective colors diffused and shaped by the light beam diffusing and shaping optical element into respective beams of substantially collimated light, and making the beams incident on the microlenses of the liquid crystal display panel; and a projection lens for projecting image light passed through the liquid crystal display panel.

In the liquid crystal projector having the above-described constitution, the red, green, and blue laser light beams emitted from the first, second, and third lasers of the light source unit are each diffused and shaped by a diffraction type or refraction type light beam diffusing and shaping optical element so as to be spread over the entire display area of a single liquid crystal display panel and be incident on corresponding pixels of a liquid crystal layer of the liquid crystal display panel. As a result, a multi-color image including red, green, and blue is projected onto an external screen.

Moreover, the first, second, and third lasers are a semiconductor laser or a solid-state laser and can therefore be miniaturized significantly, and the diffraction type or refraction type light beam diffusing and shaping optical element can also be miniaturized sufficiently. It is thus possible to miniaturize the projector as a whole significantly, and to include the projector as a whole in a small device such as a portable telephone terminal or the like.

Further, because laser light is used as illuminating light, light use efficiency is improved. In addition, black display is achieved by making corresponding display units of the liquid crystal layer block the light by a liquid crystal driving circuit rather than turning off the laser light beams of the respective colors. Therefore image contrast is not decreased.

Further, unlike the laser scan system disclosed in Japanese Patent Laid-open (Translation of PCT Application) No. 2005-526288, the projection lens magnifies and projects the image light modulated by the liquid crystal display panel as diffused light. Thus there are advantages in that screen flicker is hardly perceived and a "placid" image specific to the liquid crystal can be obtained.

As described above, according to the present invention, it is possible to miniaturize the projector as a whole to such a degree that the projector can be included in a small device such as a portable telephone terminal or the like, and to achieve an improvement in light use efficiency, which is essential as the projector, and an improvement in image contrast.

BRIEF DESCRIPTION OF DRAWINGS

FIG. 4 is a diagram showing an example of the form of arrangement of pixels and microlenses.

FIG. 7 shows diagrams illustrating an example of a refraction type optical element.

FIG. 18 is a diagram showing a portable telephone terminal as an example of an image reproducing device according to the present invention.

BEST MODE FOR CARRYING OUT THE INVENTION

1. First Embodiment (Single-Panel Type): FIGS. 1 to 13

A case of a single-panel system using one liquid crystal display panel (liquid crystal light valve) for three colors of red, green, and blue will be shown as a first embodiment.

1-1. First Example of Basic Configuration (Case of Using Diffractive Optical Element): FIGS. 1 to 5

Figure 1:
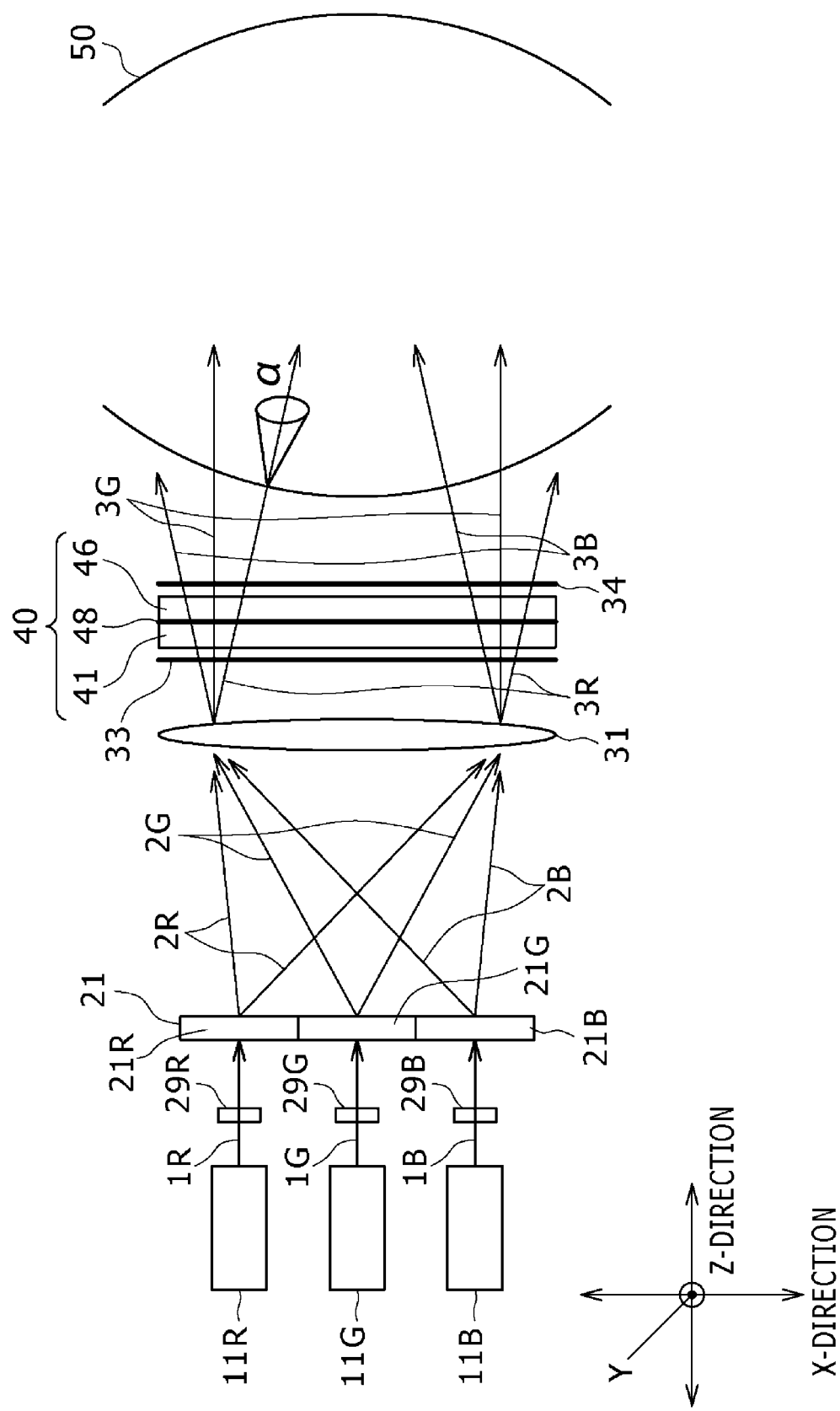
FIG. 1 is a diagram showing a first example of a single-panel type liquid crystal projector.

FIG. 1 illustrates a case of using a diffractive optical element as a light beam diffusing and shaping optical element, as a first example of basic configuration of a single-panel type liquid crystal projector.

In order to clarify directions, an X-direction, a Y-direction, and a Z-direction are defined as shown in the figures. The Y-direction is a direction perpendicular to a paper plane in FIG. 1.

<Light Source Unit>

In this example, as a light source, a red laser 11R, a green laser 11G, and a blue laser 11B are arranged and disposed in the X-direction.

A semiconductor laser is used as each of the red laser 11R and the blue laser 11B. For example, an InAlGaP base laser or the like is used as the red laser 11R. A GaN base or InGaN base laser is used as the blue laser 11B.

On the other hand, a semiconductor laser emitting green laser light is not realized at present. Thus, as the green laser 11G, a solid-state laser pumped by a semiconductor laser, that is, a so-called DPSS (Diode Pumped Solid State) laser, for example $YVO_4$+KTP($KTiOPO_4$), crystal PPLN (Periodically Poled $LiNbO_3$), PP (Periodically Poled) MgO.LN($LiNbO_3$) or the like is used.

The oscillation mode of the red laser 11R, the green laser 11G, and the blue laser 11B may be a multi-mode. For mode stability and polarization stability against changes in temperature and the like, a narrow stripe width may be achieved in a semiconductor laser, and periodical polarization inversion (periodically poled) may be achieved in a solid-state laser. In the present invention, because of insensitivity of a light beam diffusing and shaping optical element (a diffractive optical element or a refraction type optical element) to be described later to the shape of an incident light beam, a multi-mode semiconductor laser or solid-state laser can be used as the red laser 11R, the green laser 11G, and the blue laser 11B.

Of course, a single mode semiconductor laser or solid-state laser may be used. Generally, in the case of semiconductor lasers, being able to use up to multi-mode oscillation rather than mode control improves a yield of usable semiconductor lasers and reduces manufacturing cost.

A red, a green, and a blue laser light beams 1R, 1G, and 1B emitted from the red laser 11R, the green laser 11G, and the blue laser 11B are for example respectively passed through λ/2 plates (½-wavelength plates) 29R, 29G, and 29B, and made incident on a diffractive optical element 21.

Laser light emitted from semiconductor lasers or solid-state lasers does not necessarily have a constant direction of polarization between the devices because of variations in internal electric field of the lasers. The direction of polarization is also varied depending on accuracy in assembly of the devices. However, by thus inserting the λ/2 plates 29R, 29G, and 29B and adjusting the rotational position thereof, the direction of polarization of laser light beams 3R, 3G, and 3B of respective colors incident on a liquid crystal display panel 40 to be described later can be made to coincide with the axis of polarization of the liquid crystal display panel 40.

The direction of polarization may be corrected by using an appropriate phase difference film or retardation plate in place of the λ/2 plates. For example, solid-state lasers pumped by a generally used Al;GaAs base semiconductor laser and using a YVO$_4$+KTP second harmonic are changed in direction of polarization from device to device, and many of the solid-state lasers have a polarization ratio of about 10. In such a case, the polarization ratio can be increased by compensating for and optimizing a retardation value using an appropriate phase difference film.

By thus adjusting the axis of polarization by the λ/2 plate, the phase difference film or the like, it is possible to reduce a loss of light due to polarizing plates 33 and 34 in front of and in the rear of the liquid crystal display panel 40, and further improve light use efficiency.

<Diffractive Optical Element as Light Beam Diffusing and Shaping Optical Element>

In the present invention, a diffraction type or refraction type light beam diffusing and shaping optical element diffuses and shapes a laser light beam emitted from a semiconductor laser or a solid-state laser as a light source of the projector over an entire display area of the liquid crystal display panel as a liquid crystal light valve. The example of FIG. 1 is a case of using a diffractive optical element as the light beam diffusing and shaping optical element.

The diffractive optical element (DOE) itself is known as a "diffuser", a "beam shaper" or the like.

For example, Reference Document 1 (Adam Fedor; Digital Optics Corp. "Binary Optic Diffuser Design") shows the diffusion and shaping of a light beam by a "diffuser" or a "beam shaper". Reference Document 2 (Yoshifumi Ikeda "Diffraction Type Lens"; OPTRONICS, 2005, No. 3, pp. 175-178) shows a method of manufacturing a "diffraction type lens" or the like.

A diffuser diffracts light at each point of an incident light beam to each point on an output plane such that light at a certain point of the incident light beam is diffracted to a large number of points on the output plane (1:N mapping). A beam shaper diffracts light at each point of an incident light beam to each point on an output plane such that light at a certain point of the incident light beam is diffracted to a certain point on the output plane (1:1 mapping).

In the example of FIG. 1, as the diffractive optical element 21, a transmission type diffractive optical element 21R for red, a transmission type diffractive optical element 21G for green, and a transmission type diffractive optical element 21B for blue are provided so as to be arranged in a direction of arrangement of the red laser 11R, the green laser 11G, and the blue laser 11B.

Suppose that the diffractive optical element 21R for red diffuses and shapes the red laser light beam 1R emitted from the red laser 11R such that the laser light beam is spread over the entire display area of the liquid crystal display panel 40 as shown by laser light beams 2R and 3R, and is incident on red pixels of a liquid crystal layer 48 of the liquid crystal display panel 40, as will be described later.

Similarly, suppose that the diffractive optical element 21G for green diffuses and shapes the green laser light beam 1G emitted from the green laser 11G such that the laser light beam is spread over the entire display area of the liquid crystal display panel 40 as shown by laser light beams 2G and 3G, and is incident on green pixels of the liquid crystal layer 48. Suppose that the diffractive optical element 21B for blue diffuses and shapes the blue laser light beam 1B emitted from the blue laser 11B such that the laser light beam is spread over the entire display area of the liquid crystal display panel 40 as shown by laser light beams 2B and 3B, and is incident on blue pixels of the liquid crystal layer 48.

Figure 2:
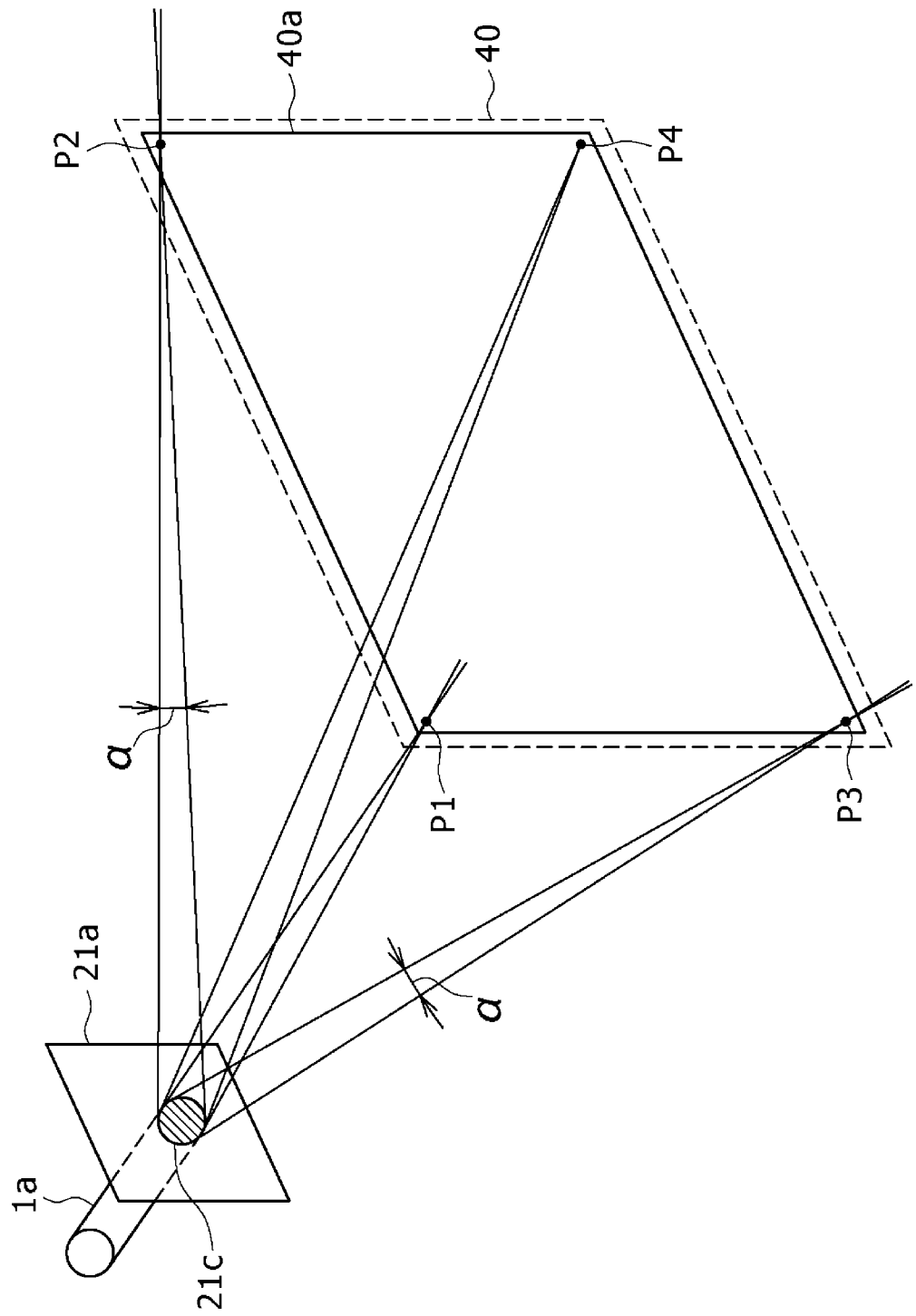
FIG. 2 is a diagram showing an example of a diffractive optical element.

That is, for example, in a case where the diffractive optical element 21R for red, the diffractive optical element 21G for green, and the diffractive optical element 21B for blue are each a Diffuser, as shown in FIG. 2 (in FIG. 2, however, the refraction of light by a field lens 31 shown in FIG. 1 is omitted), suppose that a diffractive optical element 21a for a certain color diffracts a laser light beam 1a incident on a diffraction pattern forming part 21c thereof to an entire display area 40a of the liquid crystal display panel 40 including points P1, P2, P3, and P4 at respective corners by mapping as described above. The diffractive optical element 21 as a whole is configured such that pieces of diffracted light of the respective colors from the diffractive optical elements 21R, 21G, and 21B are each diffused in the form of dots and uniformized such that dots are superimposed on each other on the display area 40a, whereby the display area 40a is irradiated.

In this case, an angle α of divergence of the light is determined by the beam diameter of the laser light beam 1a, and this angle α of divergence of the light can be made sufficiently small, such as one degree or less, as will be described later.

A laser light beam emitted from a laser generally has a Gaussian shape. It is difficult to uniformly irradiate the liquid crystal display panel 40 with the laser light beam as it is. However, by thus diffusing and shaping the laser light beam by the diffractive optical element 21 and then irradiating the liquid crystal display panel 40 with the laser light beam, a uniform luminance distribution can be obtained on the liquid crystal display panel 40.

The diffractive optical elements 21R, 21G, and 21B for the respective colors are desirably formed in a state of being integrated on one transparent substrate. This makes it possible to align the diffractive optical elements 21R, 21G, and 21B easily and accurately, and miniaturize the diffractive optical element 21 as a whole, as compared with a case where the diffractive optical elements 21R, 21G, and 21B are aligned and disposed after being formed individually.

The diffractive optical element 21 as described above can be created after a computer simulation is performed on the basis of the beam diameter and the beam shape of the laser light beams 1R, 1G, and 1B of the respective colors, a luminance distribution on a screen to be obtained, and the like.

As shown in FIG. 1, a field lens 31 is disposed in front of the diffractive optical element 21, the field lens 31 converting the red laser light beam 2R diffused and shaped by the diffractive optical element 21R for red, the green laser light beam 2G diffused and shaped by the diffractive optical element 21G for green, and the blue laser light beam 2B diffused and shaped by the diffractive optical element 21B for blue into respective laser light beams 3R, 3G, and 3B of substantially collimated light, and then making the laser light beams 3R, 3G, and 3B incident on the liquid crystal display panel 40.

<Liquid Crystal Display Panel and Projection Lens>

The liquid crystal display panel 40 is a transmissive type liquid crystal display device having a liquid crystal layer 48 formed between an incidence side substrate 41 and an emission side substrate 46. Polarizing plates 33 and 34 are disposed on the rear side and the front side of the liquid crystal display panel 40. In the case of a single-panel system as in the example of FIG. 1, a microlens array is formed in the incidence side substrate 41 of the liquid crystal display panel 40.

Figure 3:
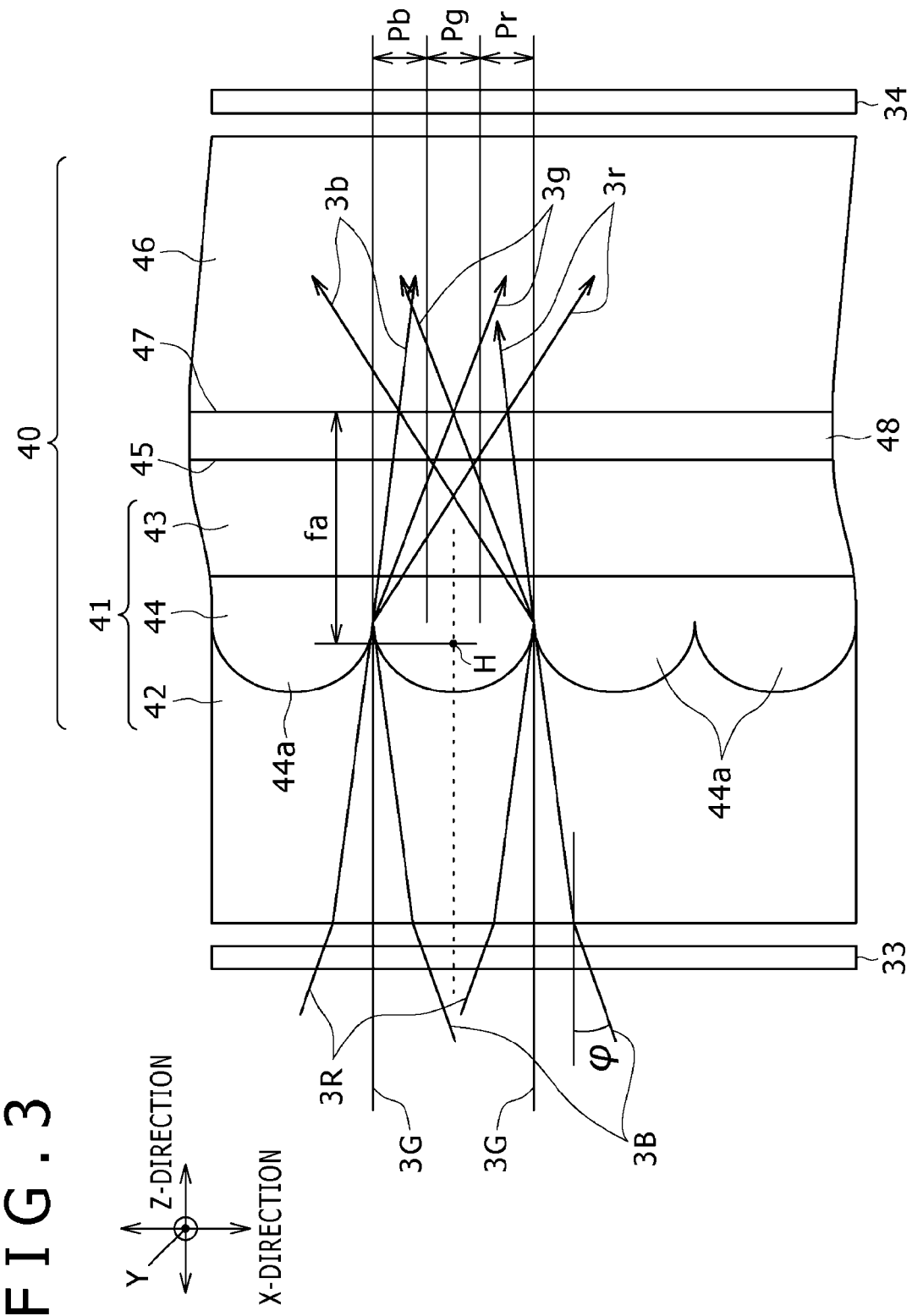
FIG. 3 is a diagram showing an example of a liquid crystal display panel.

Specifically, as shown in FIG. 3, suppose that in the incidence side substrate 41, a microlens array 44 made of a transparent resin or the like is formed between transparent substrates 42 and 43 made of quartz or the like, and that a counter common electrode 45 made of a transparent conductive material such as ITO (Indium Tin Oxide) or the like is formed on the transparent substrate 43.

Suppose that on the emission side substrate 46, a scanning line made of polysilicon, a signal line made of aluminum or the like, a pixel electrode made of a transparent conductive material such as ITO or the like, and a TFT (Thin Film Transistor) as a pixel switching element are formed as a liquid crystal driving circuit 47 of an active matrix system on one surface side of the transparent substrate made of quartz or the like.

As the liquid crystal display panel 40, the counter common electrode 45 and the liquid crystal driving circuit 47 are disposed in a state of being opposed to each other such that a small gap is formed between the incidence side substrate 41 and the emission side substrate 46 described above. A liquid crystal is injected between the counter common electrode 45 and the liquid crystal driving circuit 47 to form the liquid crystal layer 48. A red pixel (sub-pixel for red display) Pr, a green pixel (sub-pixel for green display) Pg, and a blue pixel (sub-pixel for blue display) Pb are formed.

In this case, as an example, as shown in FIG. 4, suppose that the above-described liquid crystal driving circuit 47 is formed such that a large number of sets (display units) of a red pixel Pr, a green pixel Pg, and a blue pixel Pb are formed in a so-called A arrangement as viewed from the incidence side of the laser light beams, and that the microlens array 44 has a large number of hexagonal microlenses 44a formed at a ratio of one microlens to one display unit as viewed from the incidence side of the laser light beams. Reference 19a denotes a light shielding layer (black layer) and a scanning line. Reference number 19c denotes a signal line.

Of course, display units can be arranged in a square array. In this case, the microlenses 44a are in a rectangular (square or oblong) form as viewed from the incidence side of the laser light beams. The square array is suitable for display of text and the like, and is often used in a computer display of VGA, SXGA or the like.

As shown in FIG. 1 and FIG. 3, the laser light beams 3R, 3G, and 3B to be incident on the liquid crystal display panel 40 are each converted into beams of substantially collimated light by the field lens 31. Therefore each of the microlenses 44a is desirably aspheric in order to suppress spherical aberration.

By thus forming the microlens array 44 in the incidence side substrate 41 of the liquid crystal display panel 40, as shown in FIG. 3, respective pieces of partial laser light $3r$, $3g$, and $3b$ of the red, green, and blue laser light beams 3R, 3G, and 3B respectively emitted from the red laser 11R, the green laser 11G, and the blue laser 11B, respectively diffused and shaped by the diffractive optical element 21R for red, the diffractive optical element 21G for green, and the diffractive optical element 21B for blue, and each converted into a beam of substantially collimated light by the field lens 31 are each distributed and condensed by the microlenses 44a, and enter the corresponding pixels Pr, Pg, and Pb of the liquid crystal layer 48.

That is, suppose that the above-described diffractive optical element 21R for red diffuses and shapes the red laser light beam 1R emitted from the red laser 11R so that the red laser light beam 1R ultimately enters the red pixels Pr of the liquid crystal layer 48 via the microlenses 44a. Suppose that the diffractive optical element 21G for green diffuses and shapes the green laser light beam 1G emitted from the green laser 11G so that the green laser light beam 1G ultimately enters the green pixels Pg of the liquid crystal layer 48 via the microlenses 44a. Suppose that the diffractive optical element 21B for blue diffuses and shapes the blue laser light beam 1B emitted from the blue laser 11B so that the blue laser light beam 1B ultimately enters the blue pixels Pb of the liquid crystal layer 48 via the microlenses 44a.

Each of the lasers 11R, 11G, and 11B is considered to be a pseudo point source of light. Thus, the angle α of divergence of the light shown in FIG. 1 and FIG. 2 can be made sufficiently small, an amount of light applied onto the screen can be increased significantly as compared with a case of using a lamp as a light source, and light use efficiency can be improved to about 30% even with the single-panel system. It is thus possible to reduce laser output and suppress heat generation in each laser. Such a highly efficient liquid crystal projector has never existed thus far.

A red image signal is applied to parts of the pixels Pr of the liquid crystal layer 48 of the liquid crystal display panel 40 so that transmittance of the parts of the pixels Pr is modulation-controlled. A green image signal is applied to parts of the pixels Pg of the liquid crystal layer 48 so that transmittance of the parts of the pixels Pg is modulation-controlled. A blue image signal is applied to parts of the pixels Pb of the liquid crystal layer 48 so that transmittance of the parts of the pixels Pb is modulation-controlled.

Thus, red image light is obtained as laser light passed through the parts of the pixels Pr, green image light is obtained as laser light passed through the parts of the pixels Pg, and blue image light is obtained as laser light passed through the parts of the pixels Pb. Multi-color image light resulting from synthesizing these pieces of image light of the respective colors is obtained as laser light passed through the liquid crystal display panel 40.

A projection lens 50 projects this multi-color image light onto the screen outside the projector. The projection lens 50 is formed by combining a plurality of lenses.

Concrete Example

In the example of FIG. 1, as an example, a constitution is formed as follows.

An InAlGaP base semiconductor laser having an oscillation wavelength of 635 nm to 640 nm is used as the red laser 11R. A GaN base semiconductor laser having an oscillation wavelength of 445 nm is used as the blue laser 11B. Each has an output of 100 mW, has a light divergence angle of 30 degrees (FWHM) in a vertical direction, has a light divergence angle of 10 degrees in a horizontal direction, has a single mode as a transverse mode, and has a multi-mode as a longitudinal mode.

A solid-state laser that is pumped by an 808-nm semiconductor laser, has an oscillation wavelength of 532 nm, and uses a $YVO_4$+KTP second harmonic is used as the green laser 11G. An output is 100 mW, a transverse mode is a single mode, and a longitudinal mode is a multi-mode.

Parallelism between the laser light beams 1R, 1G, and 1B is important in controlling angles of incidence on the field lens 31 of the laser light beams 2R, 2G, and 2B, which are diffused and shaped by the diffractive optical element 21. The parallelism is set to fall within one degree in the X-direction and the Y-direction. Specifically, control is performed so as to achieve such parallelism while oscillating the laser light by a so-called active alignment system.

A distance between the laser light beams 1R and 1G and a distance between the laser light beams 1G and 1B are each set to about 1.5 mm. The beam size (beam diameter) of the laser light beams 1R, 1G, and 1B on the diffractive optical element 21 is set to about 0.6 mm to 0.8 mm. As a result, the above-described light divergence angle α can be made to be one degree or less, and the angle ϕ of incidence of the laser light on the liquid crystal display panel 40 as shown in FIG. 3 can be made to be several degrees (4 to 6 degrees).

Figure 5:
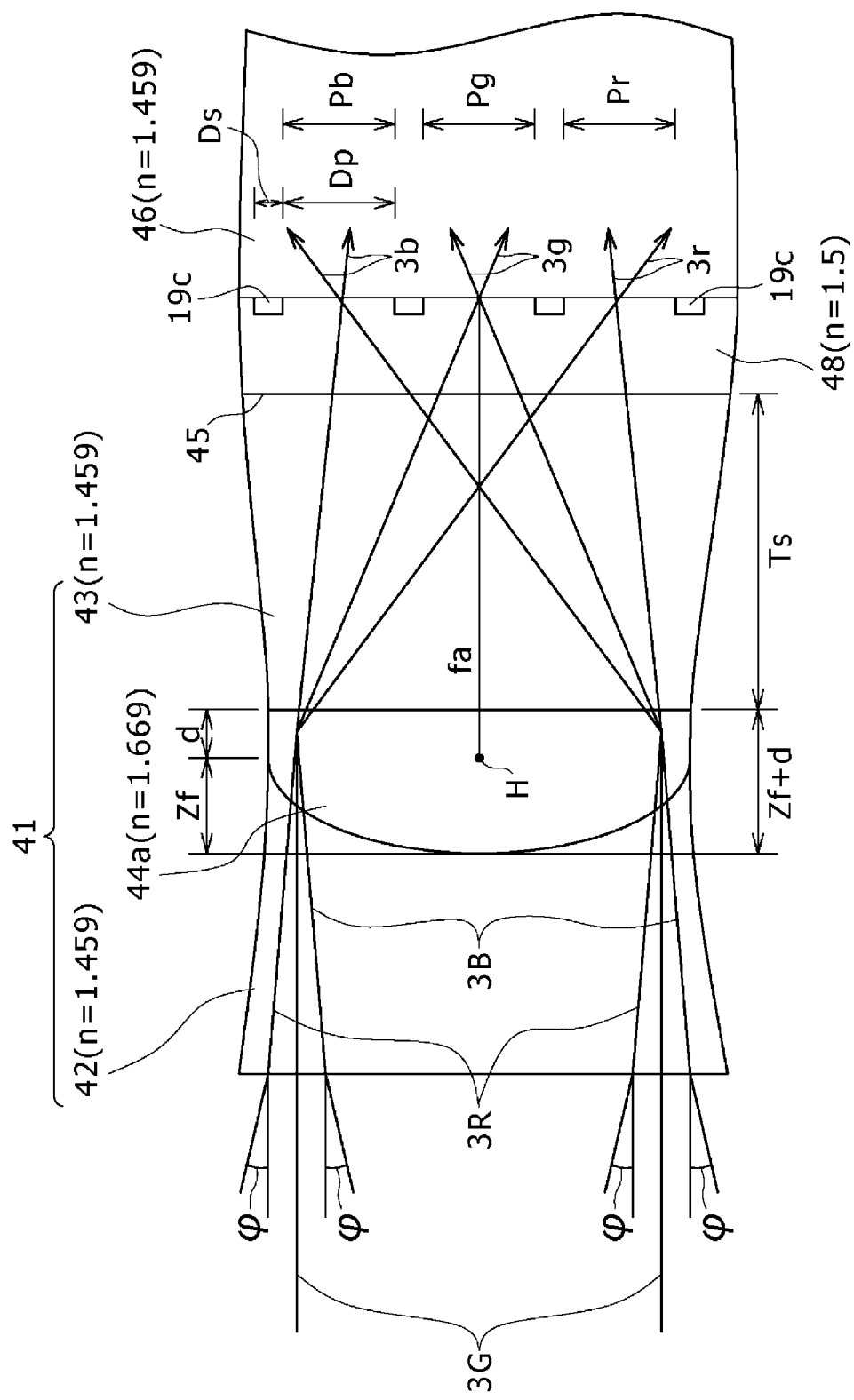
FIG. 5 is a diagram showing a concrete example of the liquid crystal display panel.

As shown in FIG. 5, the transparent substrates 42 and 43 of the incidence side substrate 41 and the emission side substrate 46 in the liquid crystal display panel 40 is formed by quartz (n=1.459). The microlenses 44a (microlens array 44) are formed by a transparent resin (an epoxy base, a thiourethane base or the like) having a refractive index of 1.669.

The width Ds of a signal line 19c is 2.0 µm. The width Dp of pixels Pr, Pg, and Pb is 8.7 µm. Thus, the pitch of a display unit formed of one pixel Pr, one pixel Pg, and one pixel Pb is 32.1 µm.

As the liquid crystal display panel 40, for example, 188 display units thus having a pitch of 32.1 µm in the X-direction and having a pitch of 20.4 µm in the Y-direction are formed in the X-direction, and 220 sets (440 columns) of display units are formed in the Y-direction with two columns as one set. Thus, the entire display area is slightly more than 6 mm in the X-direction and is slightly less than 9 mm in the Y-direction. A higher definition is possible.

Suppose that the microlenses 44a have a radius of curvature of 25.2 µm, an aspheric surface constant of −0.765, a focal length fa of about 120 µm from a principal point H as a converted value in the air.

<Effect>

The single-panel type liquid crystal projector in the example of FIG. 1 described above uses the red laser 11R, the green laser 11G, and the blue laser 11B each formed by a semiconductor laser or a solid-state laser as a light source, and uses the diffractive optical elements 21R, 21G, and 21B for the respective colors. Therefore the light source unit and the optical system of the projector as a whole can be greatly miniaturized.

The maximum angle of diffraction of the diffractive optical elements 21R, 21G, and 21B is in a trade-off relation to uniformity of luminance on the liquid crystal display panel 40. However, the maximum angle of diffraction of the diffractive optical elements 21R, 21G, and 21B can be increased to about 30 degrees without impairing uniformity of luminance. It is thereby possible to shorten a distance between the diffractive optical element 21 and the liquid crystal display panel 40, and shorten the length of the projector as a whole.

Specifically, in the above-described concrete example (prototype example), the optical system of the projector as a whole can be miniaturized to a width of 1 cm in the X-direction and the Y-direction, a length of 3.5 cm in the Z-direction, and a volume of a few $cm^3$.

In addition, because the laser light source formed of the red laser 11R, the green laser 11G, and the blue laser 11B is used as a light source, the light divergence angle α can be sufficiently decreased to for example one degree or less, and the light use efficiency can be sufficiently increased to for example about 30%. Hence, laser output power can be reduced, which is advantageous in terms of a measure against generation of heat and a measure for safety.

In addition, when a lamp is used as a light source, the light divergence angle is large (normally about 10 to 15 degrees) without an aperture or the like being used, and in the case of a single-panel system, a color mixture occurs and color purity is lowered. However, in the single-panel type liquid crystal projector in the above-described example of FIG. 1 of the present invention, the light divergence angle α can be sufficiently decreased to for example one degree or less, and therefore a decrease in color purity due to a color mixture does not occur.

In addition, because the angle of incidence of the light on the projection lens 50 can also be decreased, a lens having a large F-number can be used as the projection lens 50, so that freedom of design of the projection lens 50 is increased, and the cost of the projection lens 50 can be reduced.

Further, black display can be achieved by making corresponding display units of the liquid crystal layer 48 block light by the liquid crystal driving circuit 47 rather than turning off the laser light beams 1R, 1G, and 1B of the respective colors. Therefore image contrast is not decreased.

Further, because the light divergence angle α and the angle ϕ of incidence can be decreased as described above, a decrease in contrast due to an oblique incidence of light on the polarizing plates 33 and 34 can be reduced.

Figure 6:
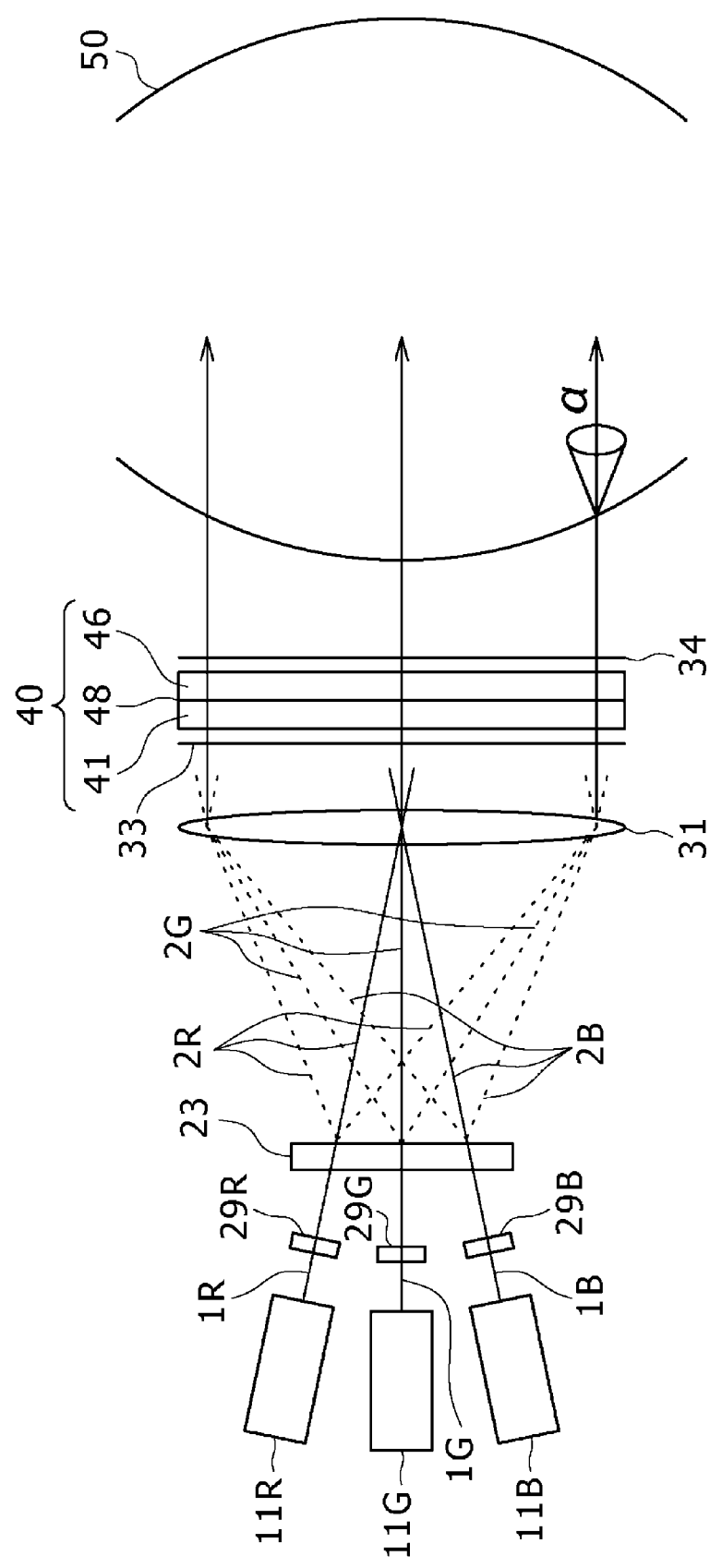
FIG. 6 is a diagram showing a second example of a single-panel type liquid crystal projector.

1-2. Second Example of Basic Configuration (Case of Using Refraction Type Optical Element): FIG. 6 and FIG. 7

FIG. 6 illustrates a case of using a refraction type optical element as a light beam diffusing and shaping optical element, as a second example of basic configuration of a single-panel type liquid crystal projector.

Also in this example, a red laser 11R, a green laser 11G, and a blue laser 11B are provided as a light source. However, in this example, the lasers 11R, 11G, and 11B are arranged such that for example laser light beams 1R and 1B on both sides are inclined at predetermined angles, respectively, with respect to a laser light beam 1G at a center so as to be directed to the principal point of a field lens 31.

This is because in the case of a refraction type optical element, unlike the case of the above-described diffractive optical element, the design of an optical system is easy when center light is made incident obliquely and the center lines of emitted light are made to coincide with each other. Of course, the laser light beams 1R, 1G, and 1B of the respective colors may be parallel to each other as in the example of FIG. 1.

Then, in this example, using a refraction type optical element as a light beam diffusing and shaping optical element, the laser light beams 1R, 1G, and 1B of the respective colors emitted from the respective lasers 11R, 11G, and 11B are for example passed through λ/2 plates 29R, 29G, and 29B, respectively, and made incident on a refraction type optical element 23.

The refraction type optical element itself is known, and reference can be made on the Internet (URL; http://www.r-pcphotonics.com/engineer_diffuser.htm, for example) and the like.

The refraction type optical element is formed by two-dimensionally assembling microlenses having various shapes and curvatures. The refraction type optical element is able to diffuse and shape a light beam by refraction of the light. Each microlens has a different curvature and a different radius, the length of a side being about 50 μm. Light that has entered each microlens is refracted by the microlens, superposed, and ultimately shaped into a predetermined form. The distribution of luminance can also be uniformized.

In the case of the diffractive optical element, a minute diffraction pattern formed on a surface forms diffracted images and superposes these pieces of diffracted light on each other. In the case of the refraction type optical element, on the other hand, the microlenses shape incident light into a predetermined shape by refracting incident light, condensing and diffusing the light, and superposing the light. The uniformity of distribution of luminance can also be obtained.

In the example of FIG. 6, a refraction type optical element having a large number of microlenses 23a as described above two-dimensionally formed on one surface side as shown in FIGS. 7(A) and (B), which show one part in an enlarged state, the microlenses 23a being common to the laser light beams 1R, 1G, and 1B of the respective colors, is disposed as the refraction type optical element 23. The laser light beams 1R, 1G, and 1B of the respective colors are diffused and shaped so as to be spread over the entire display area of a liquid crystal display panel 40 as shown by laser light beams 2R, 2G, and 2B, and be incident on corresponding pixels of a liquid crystal layer 48 of the liquid crystal display panel 40. Incidentally, light 9 in FIG. 7(B) represents a state of refraction of light entering a certain microlens.

The refractive index of the refraction type optical element is determined by only dispersion relation of a material forming the element, and the refractive index for light of respective colors is almost unchanged in a visible light region. Therefore the refraction type optical element 23 can be thus made common to the laser light beams 1R, 1G, and 1B of the respective colors.

It is possible to design such a refraction type optical element 23 by computer simulation, make a master by electroforming, and create the refraction type optical element 23 using a resin.

As in the example of FIG. 1, a field lens 31 is disposed between the refraction type optical element 23 and the liquid crystal display panel 40 to convert the laser light beams 2R, 2G, and 2B diffused and shaped by the refraction type optical element 23 into respective laser light beams of substantially collimated light and make the laser light beams incident on the liquid crystal display panel 40.

The configuration of the liquid crystal display panel 40 is the same as in the example of FIG. 1, including a respect in which a microlens array 44 is formed in an incidence side substrate 41 as shown in FIG. 3.

Hence, in this example, exactly the same effects as in the example of FIG. 1 can be obtained.

1-3. Preferred Example of Light Source Unit

FIG. 8 and FIG. 9

First Example

FIG. 8

When the lasers 11R, 11G, and 11B of the light source unit are simply arranged in one direction as in FIG. 1 or FIG. 6, and the laser light beams 1R, 1G, and 1B emitted from the respective lasers 11R, 11G, and 11B are made incident on the diffractive optical element 21 or the refraction type optical element 23 as they are, a difference between adjacent laser light beams may not be sufficiently small because of the packages of the lasers or the like.

Figure 8:
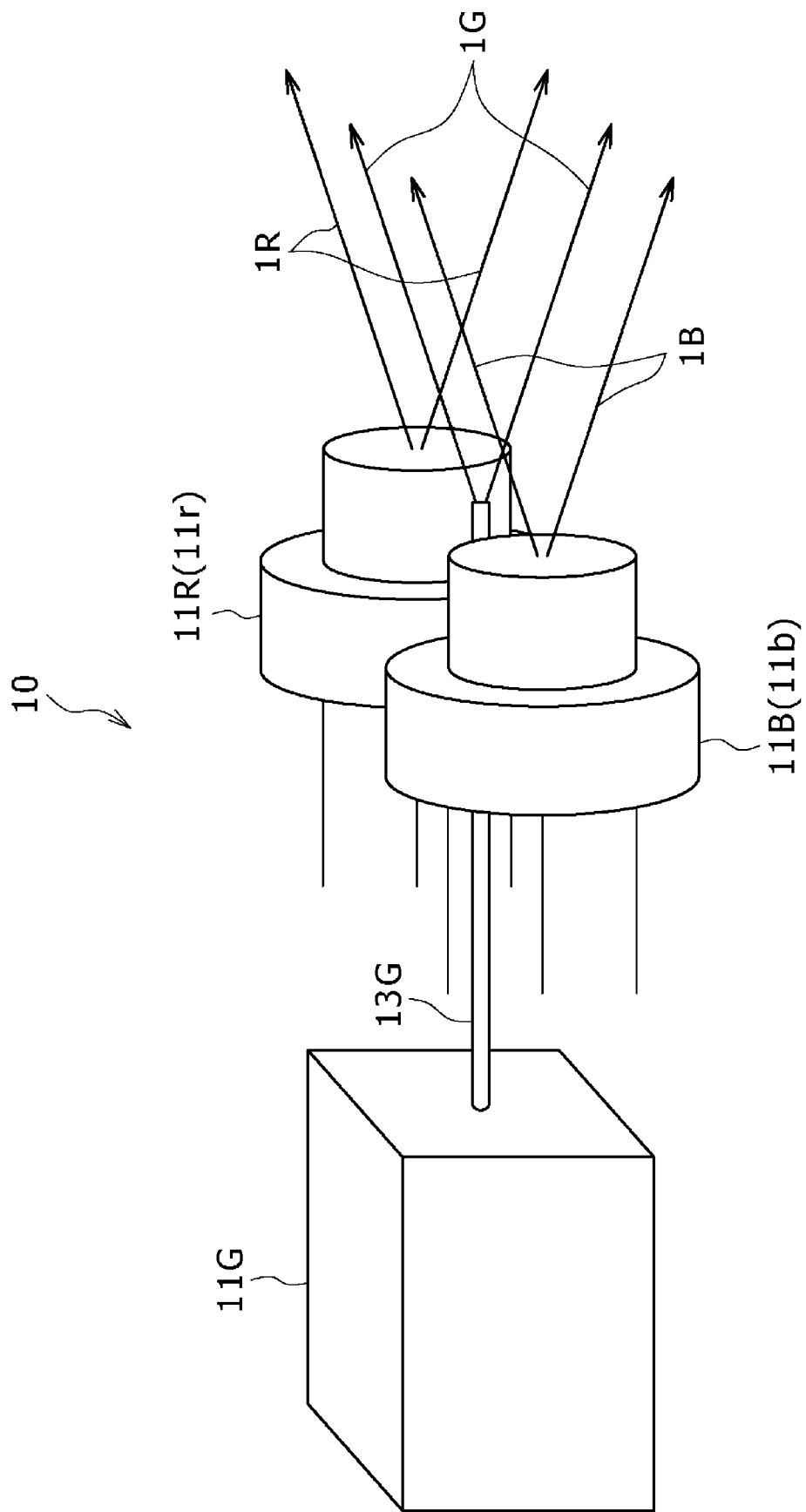
FIG. 8 is a diagram showing an example of a light source unit.

Accordingly, as an example, a light source unit 10 is formed as shown in FIG. 8. Specifically, in this example, a central green laser 11G formed by a DPSS laser is placed in a recessed position with respect to a red laser 11R and a blue laser 11B. One end of a polarization mode optical fiber 13G is connected to the green laser 11G. Another end of the optical fiber 13G is guided between a can package 11r of the red laser 11R and a can package 11b of the blue laser 11B. A green laser light beam 1G is emitted from the other end of the optical fiber 13G.

According to this, a distance between a laser light beam 1R and the laser light beam 1G and between a laser light beam 1B and the laser light beam 1G can be shortened, and in the example of FIG. 1, an interval (pitch) between the diffractive optical elements 21R and 21G and the diffractive optical elements 21B and 21G can be shortened.

In addition, by connecting only the green laser 11G to the optical fiber 13G, the green laser 11G can be placed at a distance from the red laser 11R and the blue laser 11B. Therefore a degree of freedom can be given to the disposition of the light source within a small electronic device, in particular. Such a configuration is convenient because the green laser 11G formed by a DPSS laser is generally larger than the red laser 11R and the blue laser 11B formed by a semiconductor laser.

Second Example

FIG. 9

Although a laser light beam emitted from a semiconductor laser does not have a circular sectional shape but diverges at different angles in a vertical direction and a horizontal direction as described above, a laser light beam entering the diffractive optical element 21 or the refraction type optical element 23 desirably has a sectional shape close to a circular shape. In addition, a laser light beam emitted from a DPSS laser has a rather small diameter in practice.

The light divergence angle α shown in FIG. 1, FIG. 2, and FIG. 6 is in accordance with the beam diameter of the laser light beam emitted from the laser: the smaller the beam diameter, the smaller the light divergence angle α. Thus, in a case where laser light that has entered the liquid crystal display panel 40 is condensed and made incident on corresponding pixels by the microlenses 44a as described above, to reduce the size of a condensed light shape as much as possible requires the beam diameter of the laser light beam output from the laser to be reduced as much as possible.

However, for example, when the diffractive optical element 21R for red, the diffractive optical element 21G for green, and the diffractive optical element 21B for blue are each formed as a so-called Diffuser that uniformly diffuses diffracted light in a two-dimensional direction by a periodic pitch, a laser light beam needs to be incident on the diffractive optical element 21R for red, the diffractive optical element 21G for green, and the diffractive optical element 21B for blue in such a manner as to be spread over a plurality of fundamental periods. When the beam diameter of the laser light beam 1G incident on the diffractive optical element 21G is too small, the green diffracted light cannot be uniformly diffused in the two-dimensional direction.

Thus, the laser light beams 1R, 1G, and 1B of the respective colors incident on the diffractive optical element 21 desirably have a beam diameter of about 0.5 mm to 1.0 mm.

Figure 9:
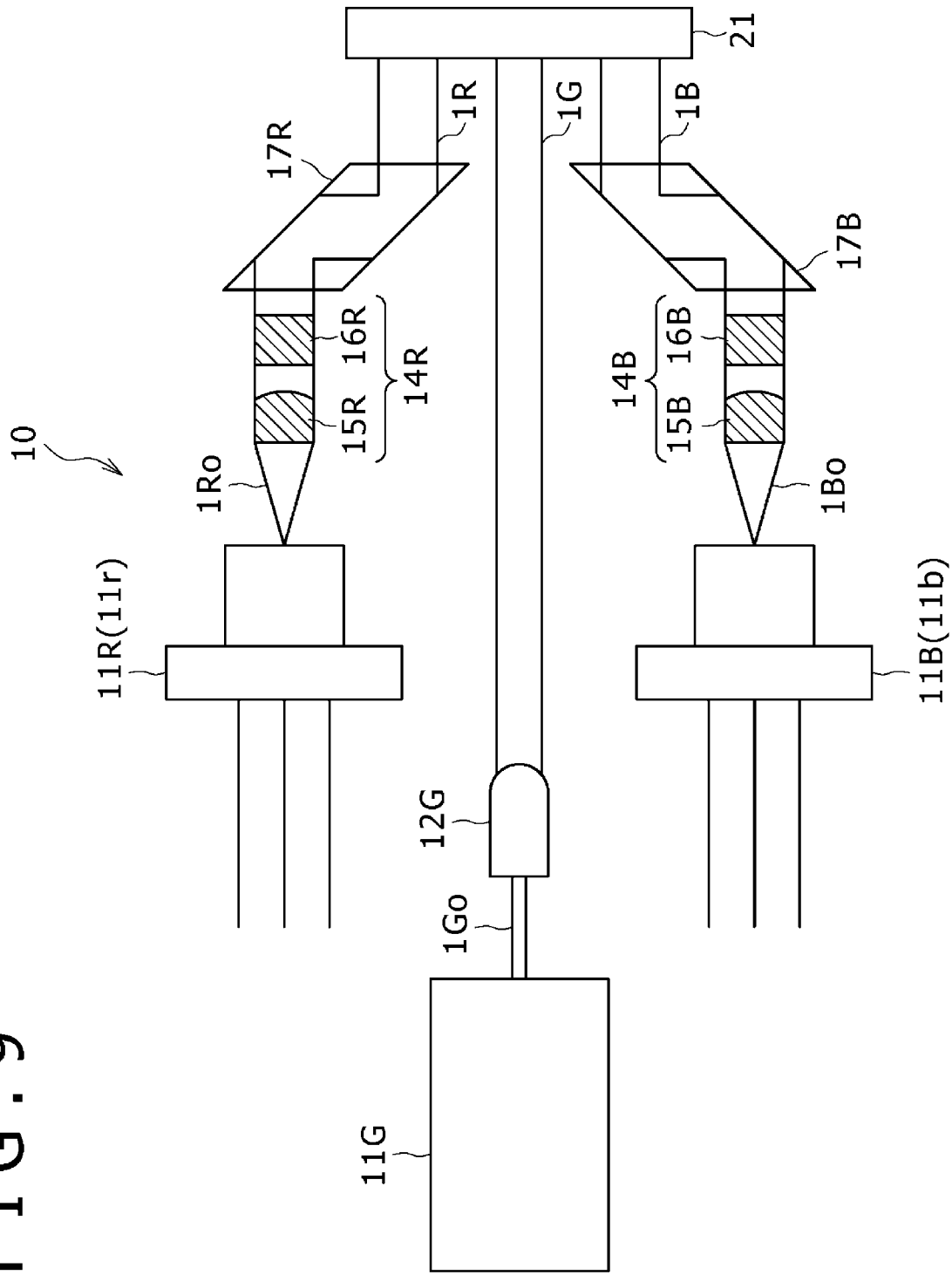
FIG. 9 is a diagram showing an example of a light source unit.

Accordingly, as an example, a light source unit is formed as shown in FIG. 9. Specifically, in this example, a laser light beam 1Go emitted from a central green laser 11G formed by a DPSS laser is increased in beam diameter by a beam expander 12G, and then made incident on a diffractive optical element 21.

In addition, the sectional shape of a laser light beam 1Ro emitted from a red laser 11R (can package 11r) is made to approximate a circular shape by a collimation unit 14R including two cylindrical lenses 15R and 16R. Further, the laser light beam 1Ro is reflected twice by a prism 17R to become a laser light beam 1R passing a position near the laser light beam 1G. The sectional shape of a laser light beam 1Bo emitted from a blue laser 11B (can package 11b) is made to approximate a circular shape by a collimation unit 14B including two cylindrical lenses 15B and 16B. Further, the laser light beam 1Bo is reflected twice by a prism 17B to become a laser light beam 1B passing a position near the laser light beam 1G.

With such a constitution, the red laser light beam 1R and the blue laser light beam 1B can have a beam diameter of 0.8 mmΦ and a section close to a circular shape, the astigmatism of the red laser light beam 1R and the blue laser light beam 1B can be reduced, and the laser light beam 1G can have a beam diameter of 0.6 mmΦ at a position on the diffractive optical element 21.

In addition, an interval between the laser light beams 1R and 1G and an interval between the laser light beams 1B and 1G can each be made sufficiently small, such as 1.5 mm or the like.

1-4. Another Example of Each Laser and Liquid Crystal Display Panel

FIGS. 10 to 13

First Example

Figure 10:
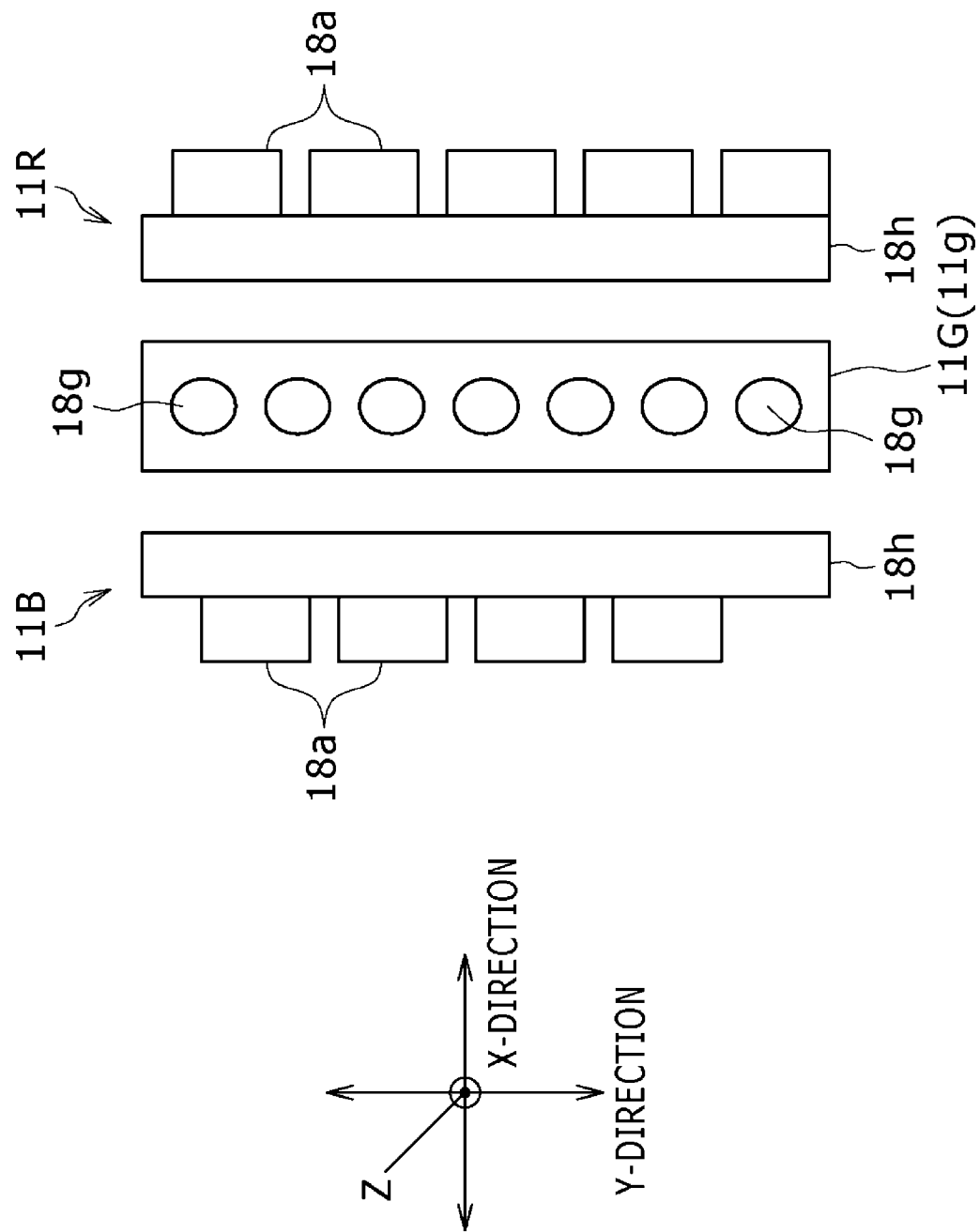
FIG. 10 is a diagram showing an example of each laser.
Figure 11:
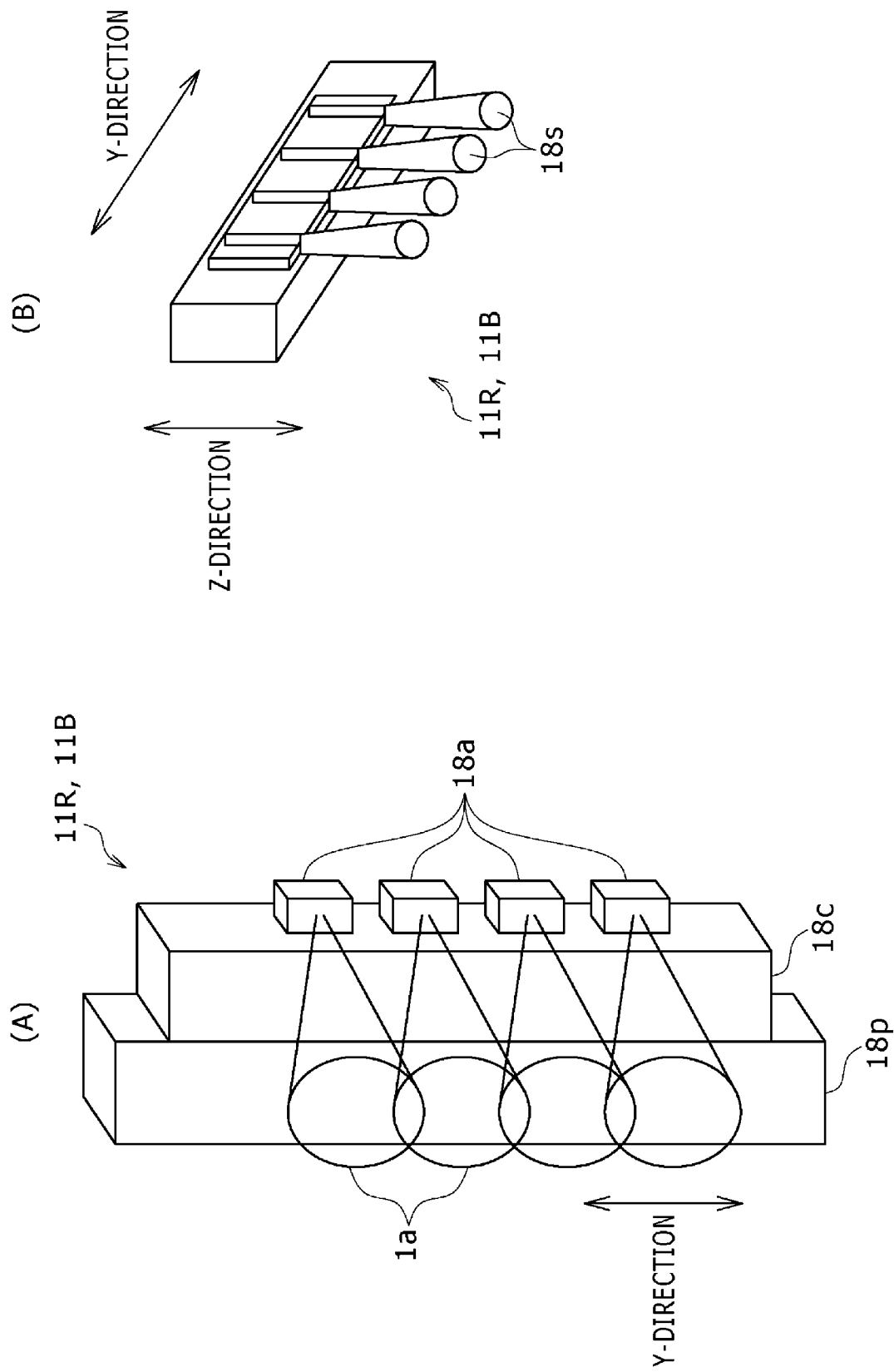
FIG. 11 shows diagrams illustrating an example of each laser.
Figure 12:
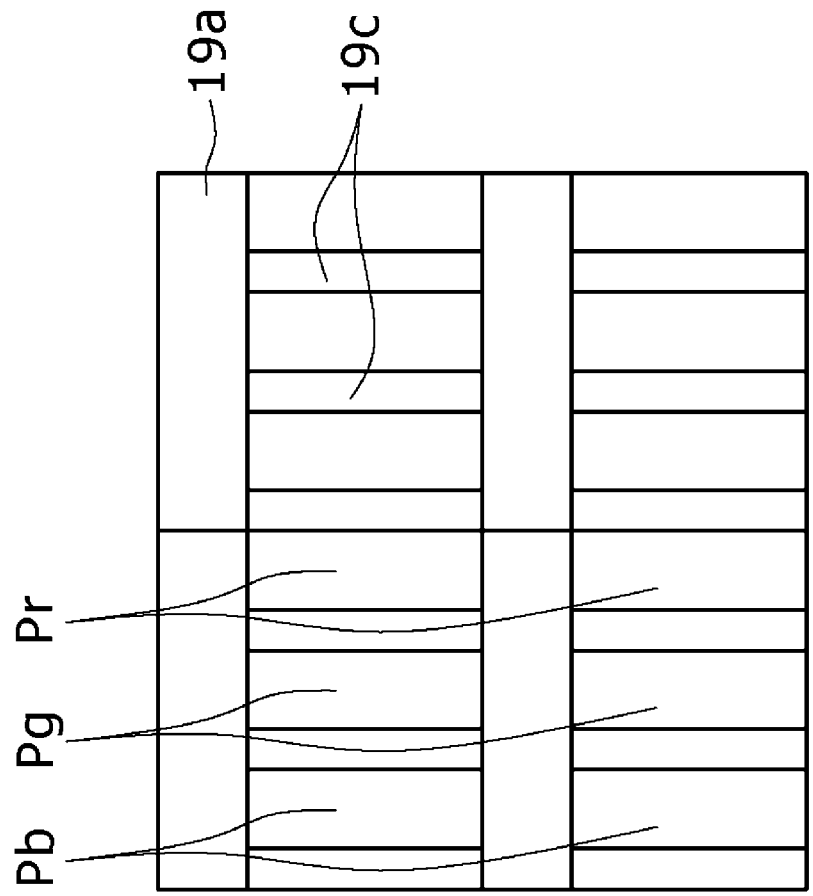
FIG. 12 is a diagram showing an example of a pixel arrangement.

FIGS. 10 to 12

The respective emission surfaces (output surfaces) of a red laser 11R, a green laser 11G, and a blue laser 11B can be extended or arranged in one direction. This is important in order to increase an amount of emitted light, in particular.

FIG. 10 shows an example thereof. FIG. 10 is a diagram as viewed from the side of a liquid crystal display panel 40. In this example, suppose that the green laser 11G formed by a DPSS laser has a plurality of output surfaces 18g arranged and formed in the Y-direction on a package 11g thereof, so that a laser light beam is emitted from each of the output surfaces 18g, and suppose that the red laser 11R and the blue laser 11B each have a plurality of semiconductor lasers 18a arranged and formed in the Y-direction on a heat sink 18h, so that a laser light beam is emitted from each of the semiconductor lasers 18a.

Alternatively, suppose that as shown in FIG. 11(A), each of the red laser 11R and the blue laser 11B has a metallic block 18c of copper or the like formed on one surface of a Peltier element 18p and has a plurality of semiconductor lasers 18a arranged and formed in the Y-direction on one surface of the metallic block 18c, so that a laser light beam 1a is emitted from each of the semiconductor lasers 18a. Alternatively, suppose that as shown in FIG. 11(B), a laser light beam is emitted from each semiconductor laser 18s as an edge emitting multi stripe semiconductor laser.

In this case, the liquid crystal display panel 40 may have a so-called square array in which pixels of a same color are arranged in the Y-direction, as shown in FIG. 12 (FIG. 12 is a diagram as viewed from the incidence side of the laser light beams). The square array is desirable especially when text or graphics are displayed.

In addition, in this case, when light source images on pixels Pr, Pg, and Pb are in the form of lines (in the form of slits) extending in the Y-direction rather than the form of a dot (the form of a spot) of each pixel, the microlenses 44a shown in FIG. 3 can be cylindrical lenses extending in the Y-direction. Also when the microlenses 44a are cylindrical lenses, the sections thereof on a light incidence side desirably have an elliptic shape, a hyperbolic shape or the like.

Incidentally, when the emission surfaces of the red laser 11R, the green laser 11G, and the blue laser 11B are thus extended or arranged in one direction, a collimator lens is used in place of the above-described field lens 31.

By extending or arranging the emission surfaces of the red laser 11R, the green laser 11G, and the blue laser 11B in one direction as in the above-described example, it is possible to increase the light amount of total laser light of each color, heighten the luminance of an image, and reduce speckle noise specific to lasers.

In addition, by setting the number of output surfaces 18g or semiconductor lasers 18a in the example of FIG. 10 or FIG. 11(A) or setting the number of semiconductor lasers 18s in the example of FIG. 11(B), the light amount of total laser light of each color can be uniformized or adjusted.

Second Example

FIG. 13

Further, a red laser 11R, a green laser 11G, and a blue laser 11B can be integrated in one substrate.

Figure 13:
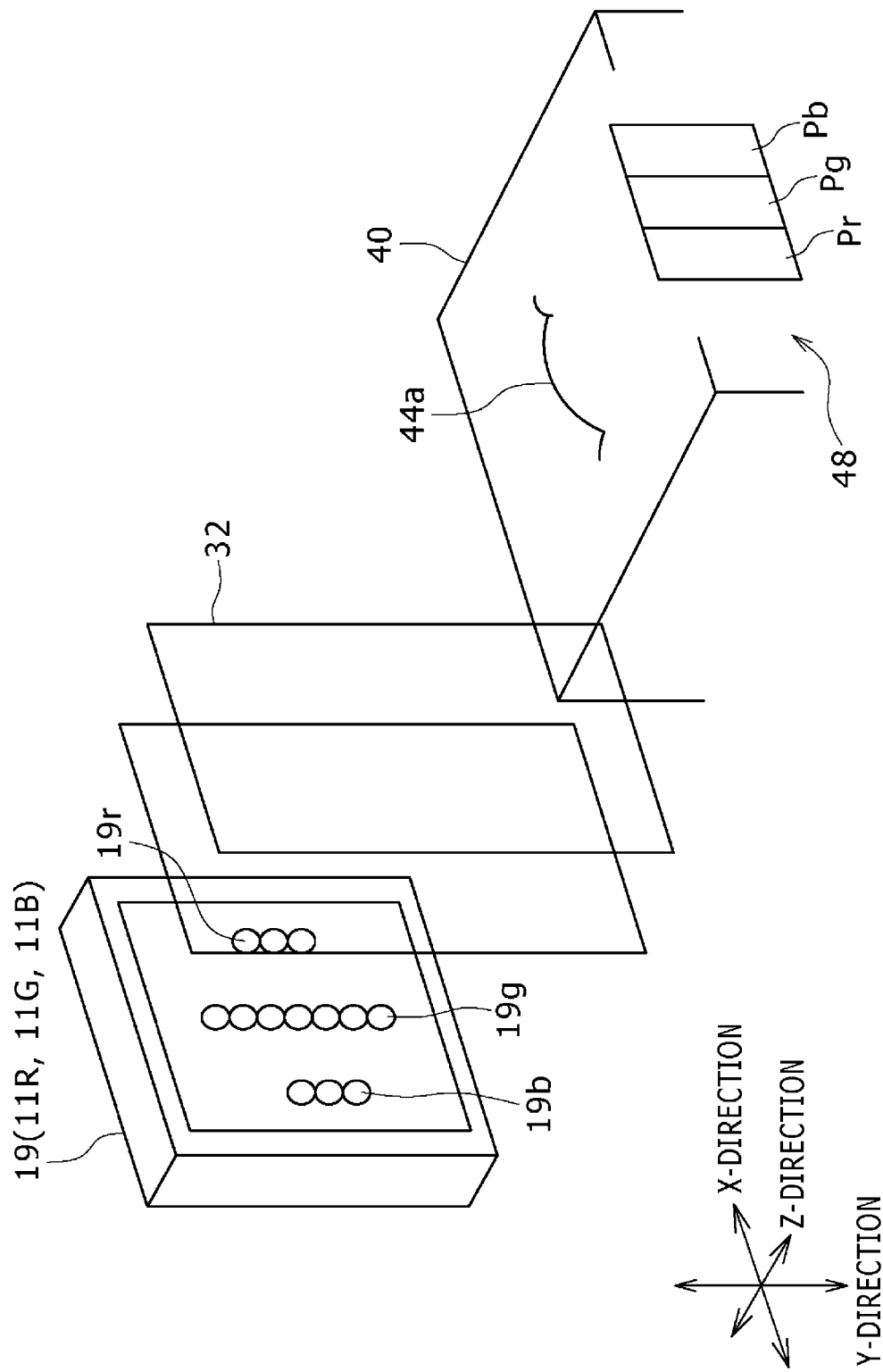
FIG. 13 is a diagram showing an example in which each laser is integrated in one substrate.

FIG. 13 shows an example thereof. In this example, a heat sink laser array 19 in which a plurality of lasers (emitting surfaces) 19r emitting red laser light, a plurality of lasers (emitting surfaces) 19g emitting green laser light, and a plurality of lasers (emitting surfaces) 19b emitting blue laser light are arranged and formed in the Y-direction is used as a laser light source having the red laser 11R, the green laser 11G, and the blue laser 11B integrated therein.

The red laser light emitted from the lasers 19r, the green laser light emitted from the lasers 19g, and the blue laser light emitted from the lasers 19b are each diffused and shaped by a diffractive optical element 21 (or a refraction type optical element 23), and made incident on a red pixel Pr, a green pixel Pg, and a blue pixel Pb of a liquid crystal layer 48 via a collimator lens 32 and via the microlenses 44a of a liquid crystal display panel 40.

Also in this case, the liquid crystal display panel 40 can have a square array as shown in FIG. 12. When light source images on pixels Pr, Pg, and Pb are in the form of lines extending in the Y-direction, the microlenses 44a can be cylindrical lenses extending in the Y-direction.

<Others>

A laser light beam of any color may be arbitrarily positioned at a center. However, for example, when a Diffuser is used as the diffractive optical element 21, in order to increase the above-described angle of diffraction, it is desirable to position a blue laser light beam of a short wavelength at a center unlike each of the examples shown in the figures.

Figure 14:
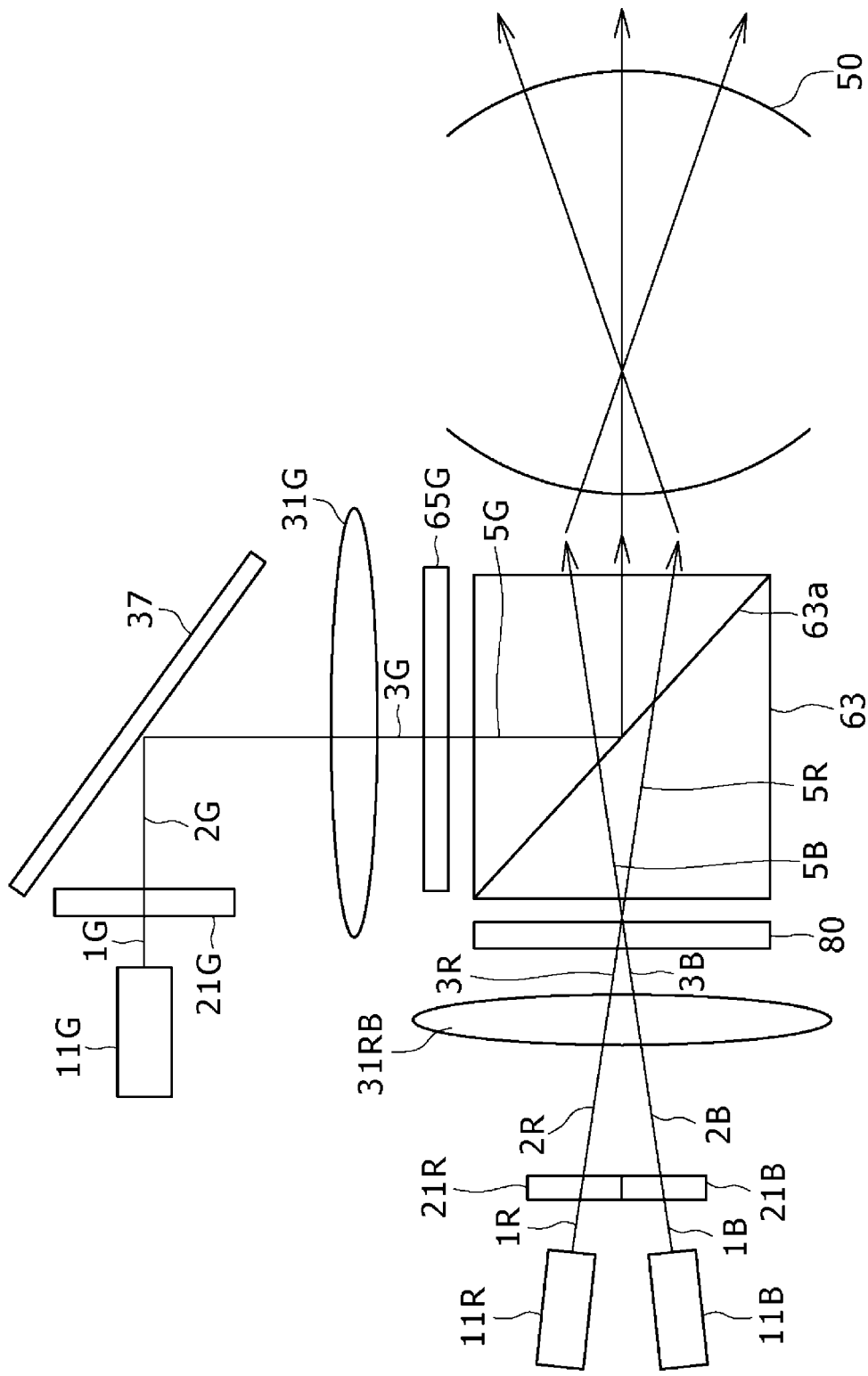
FIG. 14 is a diagram showing an example of a two-panel type liquid crystal projector.
Figure 15:
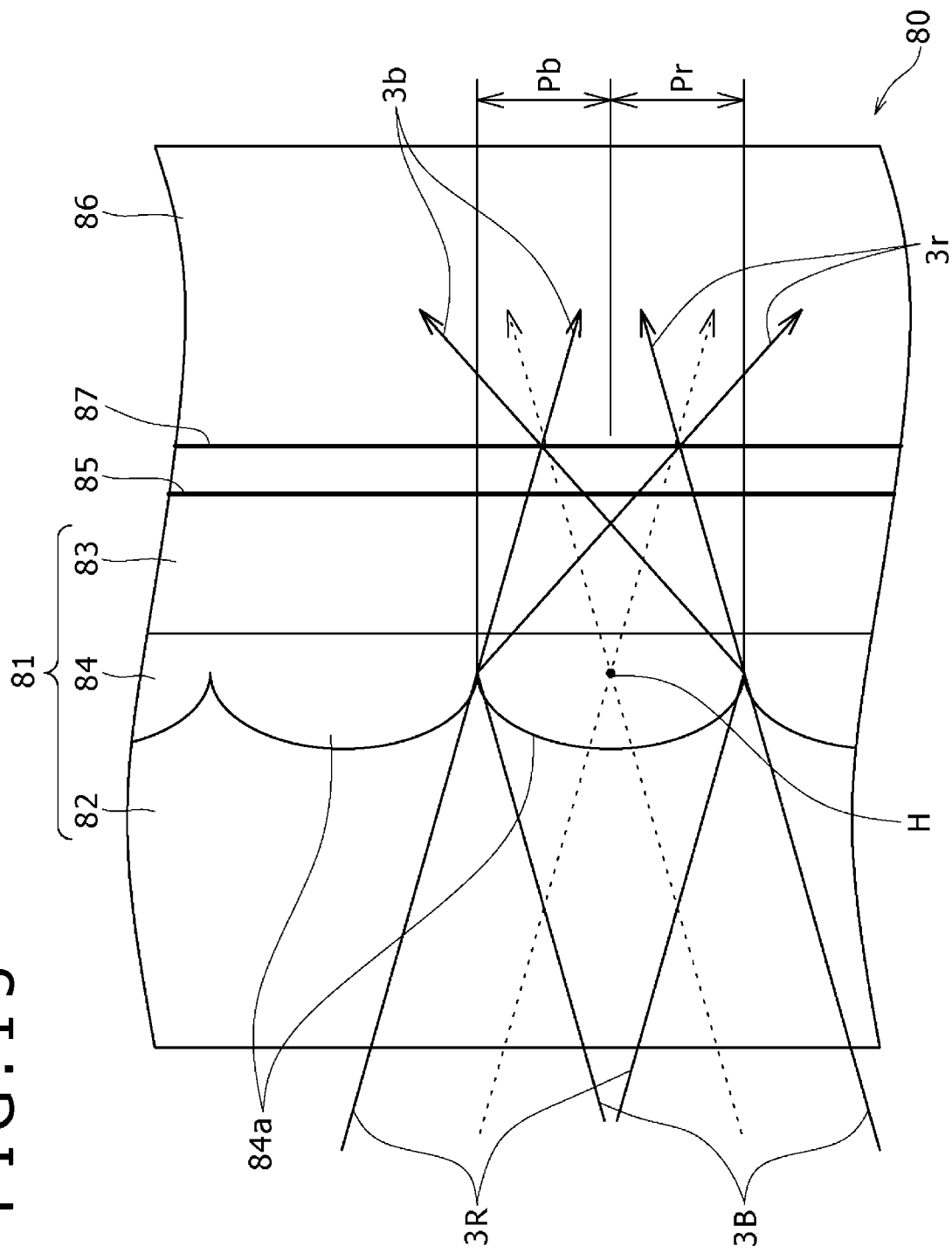
FIG. 15 is a diagram showing an example of a liquid crystal display panel.
Figure 16:
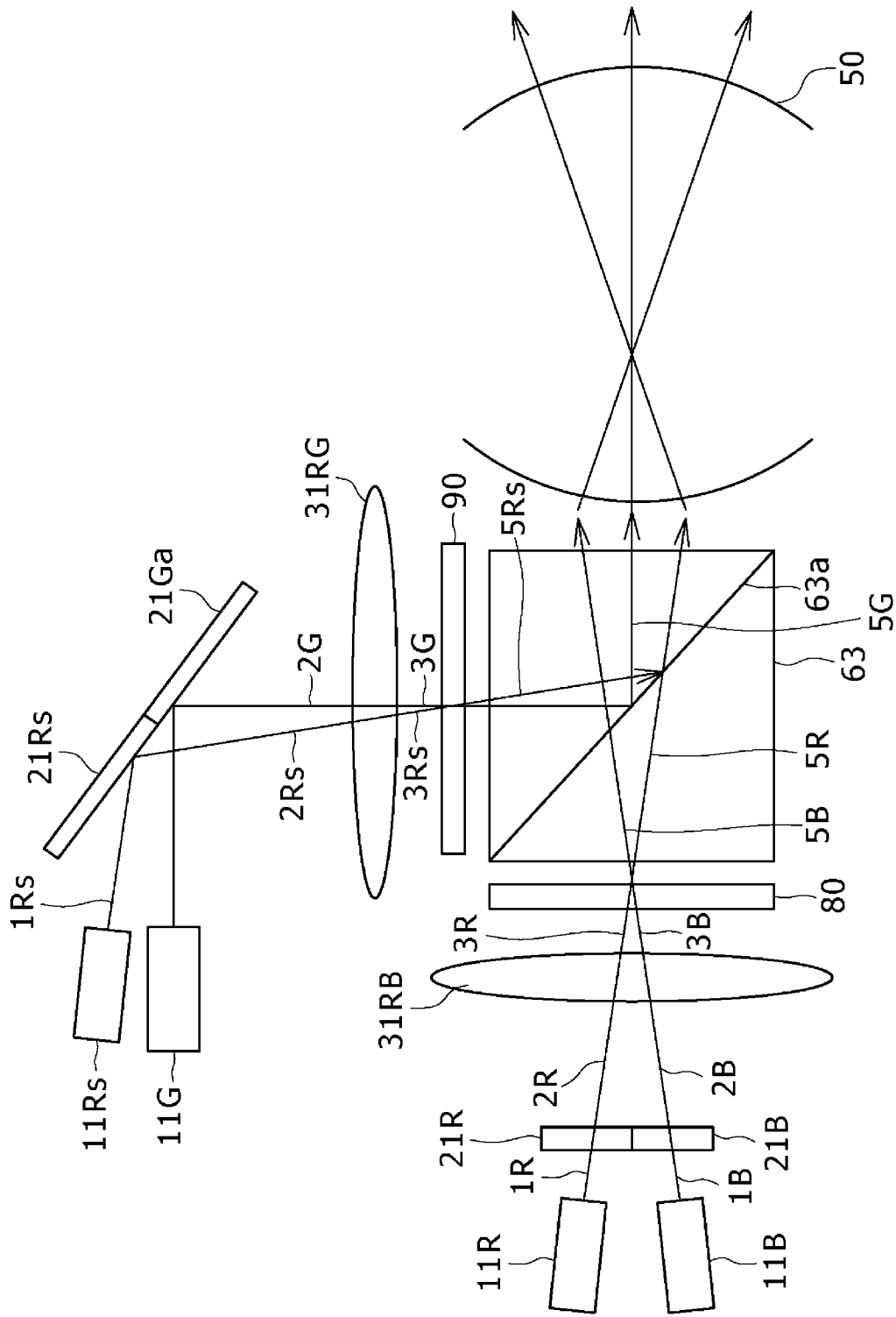
FIG. 16 is a diagram showing an example of a two-panel type liquid crystal projector.

2. Second Embodiment (Two-Panel Type): FIGS. 14 to 16

A case of a two-panel system using two liquid crystal display panels (liquid crystal light valves) for three colors of red, green, and blue will be shown as a second embodiment.

2-1. First Example

FIG. 14 and FIG. 15

FIG. 14 shows an example of a two-panel type liquid crystal projector.

In this example, as a light source, a red laser 11R and a blue laser 11B are disposed in proximity to each other, and a green laser 11G is disposed at a different position. The red laser 11R and the blue laser 11B are each a semiconductor laser as described above. The green laser 11G is a DPSS laser as described above.

Though not shown in FIG. 14, it is desirable that also in this example, as in the example of FIG. 9, a collimation optical system for bringing the sectional shape of a laser light beam emitted from each of the red laser 11R and the blue laser 11B close to a circular shape be provided for the red laser 11R and the blue laser 11B, and a beam expander for increasing the beam diameter of a laser light beam emitted from the green laser 11G be provided for the green laser 11G.

A diffractive optical element 21R for red and a diffractive optical element 21B for blue are arranged in front of the red laser 11R and the blue laser 11B. Thereby, the red laser light beam 1R emitted from the red laser 11R and the blue laser light beam 1B emitted from the blue laser 11B are each diffused and shaped so as to be spread over the entire display area of a liquid crystal display panel 80 to be described later and be incident on corresponding pixels thereof.

The laser light beams 2R and 2B diffused and shaped by the diffractive optical element 21R for red and the diffractive optical element 21B for blue are converted into laser light beams 3R and 3B, respectively, as collimated light beams by a field lens 31RB, and then made incident on the liquid crystal display panel 80.

In the liquid crystal display panel 80, a liquid crystal layer constituting red and blue pixels is formed between an incidence side substrate, in which a microlens array is formed, and an emission side substrate.

Specifically, as shown in FIG. 15, suppose that an incidence side substrate 81 has a microlens array 84 formed between transparent substrates 82 and 83, and that a counter common electrode 85 made of a transparent conductive material such as ITO or the like is formed on the transparent substrate 83. Suppose that on an emission side substrate 86, a scanning line, a signal line, a pixel electrode made of a transparent conductive material such as ITO or the like, and a TFT as a pixel switching element are formed as a liquid crystal driving circuit 87 of an active matrix system on one surface side of the transparent substrate.

As the liquid crystal display panel 80, the counter common electrode 85 and the liquid crystal driving circuit 87 are disposed in a state of being opposed to each other such that a small gap is formed between the incidence side substrate 81 and the emission side substrate 86 described above. A liquid crystal is injected between the counter common electrode 85 and the liquid crystal driving circuit 87 to form a liquid crystal layer 88. A red pixel Pr and a blue pixel Pb are formed.

Microlenses 84a are formed at a ratio of one microlens to one set (display unit) of a red pixel Pr and a blue pixel Pb. In addition, when pixels of a same color are arranged in a direction perpendicular to the paper plane of FIG. 15, the microlenses 84a can be cylindrical lenses extending in the direction perpendicular to the paper plane of FIG. 15.

As shown in FIG. 15, respective pieces of partial laser light 3r and 3b of the red and blue laser light beams 3R and 3B converted into the collimated light beams by the field lens 31RB and then made incident on the liquid crystal display panel 80 are each distributed and condensed by the microlenses 84a, and enter the corresponding pixels Pr and Pb of the liquid crystal layer 88.

A red image signal is applied to the part of the pixel Pr of the liquid crystal layer 88 of the liquid crystal display panel 80 so that transmittance of the part of the pixel Pr is modulation-controlled. A blue image signal is applied to the part of the pixel Pb of the liquid crystal layer 88 so that transmittance of the part of the pixel Pb is modulation-controlled.

Thus, red image light is obtained as laser light passed through the part of the pixel Pr, and blue image light is obtained as laser light passed through the part of the pixel Pb.

As shown in FIG. 14, the red image light 5R and the blue image light 5B are passed through a dichroic prism 63, and then made incident on a projection lens 50.

On the other hand, a diffractive optical element 21G for green is arranged in front of the green laser 11G. Thereby, the green laser light beam 1G emitted from the green laser 11G is diffused and shaped so as to be spread over the entire display area of a liquid crystal display panel 65G to be described later and be incident on each pixel thereof.

The laser light beam 2G diffused and shaped by the diffractive optical element 21G for green is reflected by a mirror 37, converted into a laser light beam 3G as a collimated light beam by a field lens 31G, and then made incident on the liquid crystal display panel 65G.

The liquid crystal display panel 65G is a liquid crystal display device for single color display. A pixel thereof corresponds to a display unit formed of a red pixel Pr and a blue pixel Pb of the above-described liquid crystal display panel 80. A green image signal is applied to the part of each pixel thereof so that transmittance of the part of each pixel is modulation-controlled. Thus, green image light 5G is obtained as laser light passed through the liquid crystal display panel 65G.

The green image light 5G is reflected by a reflection coating 63a of the dichroic prism 63, and then made incident on the projection lens 50.

Thus, as in the case of the single-panel system, multi-color image light can be projected onto a screen outside the projector.

Incidentally, for example, an angle between the red laser light beam 1R and the blue laser light beam 1B is set at six degrees.

In the example of FIG. 14, the diffractive optical element 21G for green is a transmission type diffractive optical element. However, a reflection type diffractive optical element may be disposed as a diffractive optical element for green at the position of the mirror 37.

Further, a refraction type optical element as described above can be used in place of each of the diffractive optical elements.

2-2. Second Example

FIG. 16

Red light having a wavelength of about 620 nm has a highest degree of recognition as red. However, current semiconductor lasers providing laser light having a wavelength of about 620 nm lack stability with respect to temperature, for example, and are thus inferior in reliability. Thus, for example, a semiconductor laser providing laser light having a wavelength of about 640 nm, which laser light has a somewhat lower degree of recognition as red but is of high reliability, is used as a red laser.

Accordingly, as another example of a two-panel type liquid crystal projector, as shown in FIG. 16, two red lasers are used to increase the degree of recognition as red.

Specifically, in the example of FIG. 16, a red laser 11Rs and a green laser 11G are disposed in proximity to each other at the position of the green laser 11G in the example of FIG. 14. The red laser 11Rs is a semiconductor laser similar to the red laser 11R.

A reflection type diffractive optical element 21Rs for red and a reflection type diffractive optical element 21Ga for green are arranged in front of the red laser 11Rs and the green laser 11G, respectively. Thereby, a red laser light beam 1Rs emitted from the red laser 11Rs and a green laser light beam 1G emitted from the green laser 11G are each reflected, and then diffused and shaped so as to be spread over the entire display area of a liquid crystal display panel 90 to be described later and be incident on corresponding pixels thereof.

The laser light beams 2Rs and 2G reflected and then diffused and shaped by the diffractive optical element 21Rs for red and the diffractive optical element 21Ga for green are converted into laser light beams 3Rs and 3G, respectively, as collimated light beams by a field lens 31RG, and then made incident on the liquid crystal display panel 90.

In the liquid crystal display panel 90, a liquid crystal layer constituting red and blue pixels is formed between an incidence side substrate, in which a microlens array is formed, and an emission side substrate. The liquid crystal display panel 90 is obtained by replacing the blue pixels Pb of the liquid crystal display panel 80 shown in FIG. 15 with green pixels.

Thus, red image light 5Rs and green image light 5G are obtained as laser light passed through the liquid crystal display panel 90.

An optical system for a red laser 11R and a blue laser 11B at a different position is the same as in the example of FIG. 14.

Then, in the example of FIG. 16, the red image light 5Rs passed through the liquid crystal display panel is reflected by a reflection coating 63a of a dichroic prism 63, combined with red image light 5R passed through a liquid crystal display panel 80, and then made incident on a projection lens 50, and the green image light 5G passed through the liquid crystal display panel 90 is reflected by the reflection coating 63a of the dichroic prism 63, and then made incident on the projection lens 50. Blue image light 5B passed through the liquid crystal display panel 80 is passed through the dichroic prism 63, and then made incident on the projection lens 50.

Thus, multi-color image light can be projected onto a screen outside the projector, and the degree of recognition as red in the multi-color image can be increased.

Incidentally, for example, the angle of the laser light beam 1Rs with respect to the laser light beam 1G is set at 1.5 degrees, and the angle of the laser light beam 2Rs with respect to the laser light beam 2G is set at 3 degrees.

Also in this example, a refraction type optical element as described above can be used in place of each of the diffractive optical elements.

3. Third Embodiment

Figure 17:
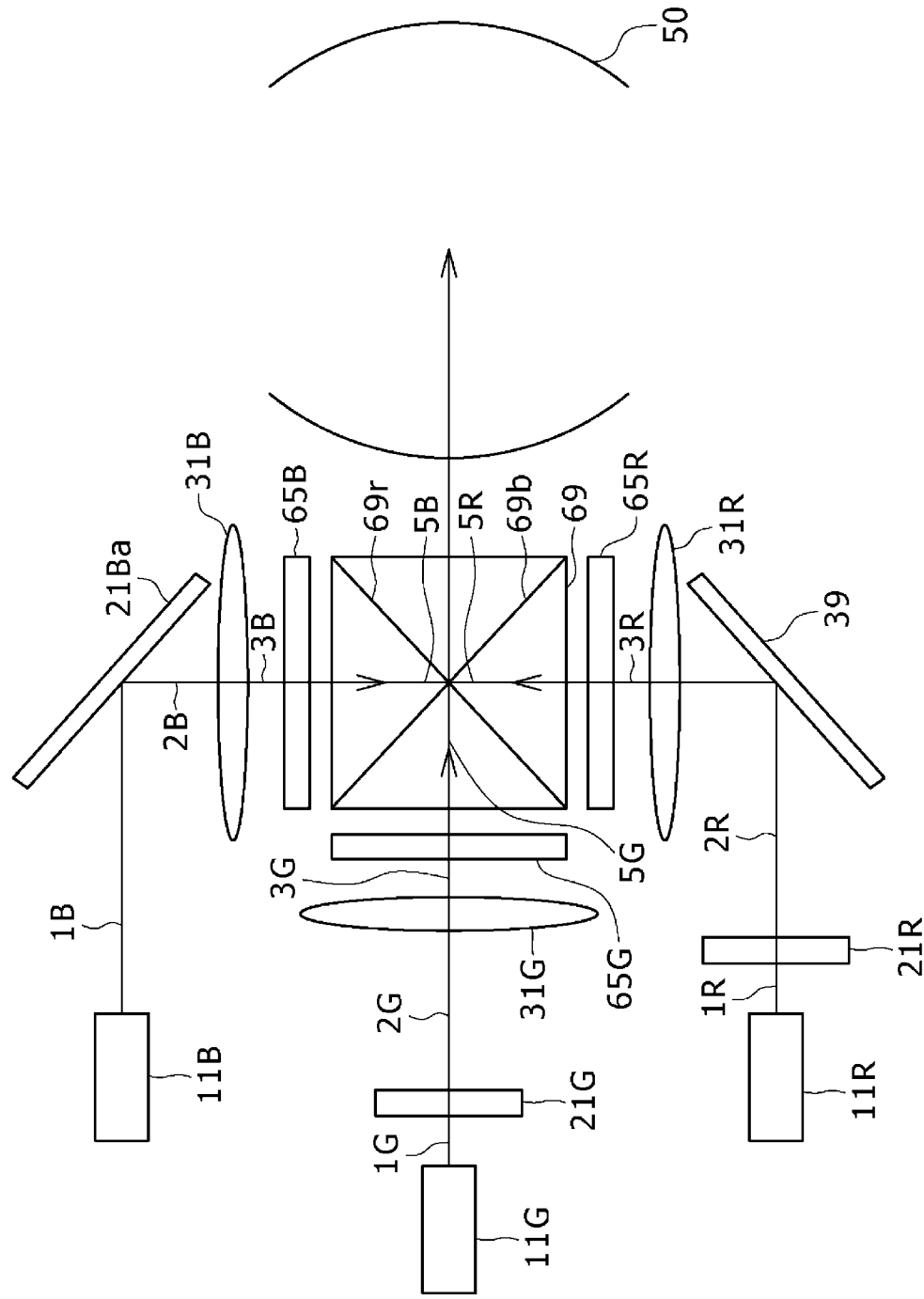
FIG. 17 is a diagram showing an example of a three-panel type liquid crystal projector.

(Three-Panel System): FIG. 17

A case of a three-panel system using separate liquid crystal display panels (liquid crystal light valves) for three colors of red, green, and blue will be shown as a third embodiment.

FIG. 17 shows an example of a three-panel type liquid crystal projector.

In this example, a red laser 11R, a green laser 11G, and a blue laser 11B are disposed at different positions. A diffractive optical element 21R for red diffuses and shapes a red laser light beam 1R emitted from the red laser 11R such that the red laser light beam 1R is spread over the entire display area of a liquid crystal display panel 65R to be described later and is incident on each pixel thereof. A diffractive optical element 21G for green diffuses and shapes a green laser light beam 1G emitted from the green laser 11G such that the green laser light beam 1G is spread over the entire display area of a liquid crystal display panel 65G to be described later and is incident on each pixel thereof. A reflection type diffractive optical element 21Ba for blue reflects a blue laser light beam 1B emitted from the blue laser 11B, and diffuses and shapes the blue laser light beam 1B such that the blue laser light beam 1B is spread over the entire display area of a liquid crystal display panel 65B to be described later and is incident on each pixel thereof.

The laser light beam 2R diffused and shaped by the diffractive optical element 21R for red is reflected by a mirror 39, converted into a laser light beam 3R as a collimated light beam by a field lens 31R, and then made incident on the liquid crystal display panel 65R. The laser light beam 2G diffused and shaped by the diffractive optical element 21G for green is converted into a laser light beam 3G as a collimated light beam by a field lens 31G, and then made incident on the liquid crystal display panel 65G. The laser light beam 2B reflected and diffused and shaped by the diffractive optical element 21Ba for blue is converted into a laser light beam 3B as a collimated light beam by a field lens 31B, and then made incident on the liquid crystal display panel 65B.

The liquid crystal display panel 65R is a liquid crystal display device for display of the single color of red. The liquid crystal display panel 65G is a liquid crystal display device for display of the single color of green. The liquid crystal display panel 65B is a liquid crystal display device for display of the single color of blue.

Thus, red image light 5R is obtained as laser light passed through the liquid crystal display panel 65R. Green image light 5G is obtained as laser light passed through the liquid crystal display panel 65G. Blue image light 5B is obtained as laser light passed through the liquid crystal display panel 65B.

In the example of FIG. 17, the green image light 5G is passed through a cross dichroic prism 69, and then made incident on a projection lens 50. The red image light 5R is reflected by a reflection coating 69r of the cross dichroic prism 69, and then made incident on the projection lens 50. The blue image light 5B is reflected by a reflection coating 69b of the cross dichroic prism 69, and then made incident on the projection lens 50.

Thus, as in the cases of the single-panel system and the two-panel system, multi-color image light can be projected onto a screen outside the projector.

Incidentally, a reflection type diffractive optical element for red may be disposed at the position of the mirror 39 in place of the transmission type diffractive optical element 21R for red. A mirror may be disposed at the position of the diffractive optical element 21Ba for blue in place of the reflection type diffractive optical element 21Ba for blue, and a transmission type diffractive optical element may be disposed at a position in the rear thereof.

Further, also in this example, a refraction type optical element as described above can be used in place of each of the diffractive optical elements.

4. Fourth Embodiment

Case of Two Colors or One Color

Each of the foregoing embodiments is a configuration for the three colors of red, green, and blue. However, a configuration for two or one of the three colors can be made.

For example, in a case of a single-panel system of a configuration for the two colors of red and blue, it suffices not to provide the green laser 11G and the diffractive optical element 21G for green in the example of FIG. 1 and to form the liquid crystal display panel 40 as the liquid crystal display panel 80 shown in FIG. 15. In a case of a two-panel system of a configuration for the two colors of red and green, it suffices not to provide the blue laser 11B and the diffractive optical element 21B for blue in the example of FIG. 14 and to make the liquid crystal display panel 80 a liquid crystal display device for display of the single color of red.

In addition, for example, in a case of a configuration for the one color of green, it suffices not to provide the red laser 11R, the blue laser 11B, the diffractive optical element 21R for red, and the diffractive optical element 21B for blue in the example of FIG. 1, and to make the liquid crystal display panel 40 a liquid crystal display device for display of the single color of green.

5. Embodiment as Image Reproducing Device

FIG. 18

FIG. 18 shows an example of an image reproducing device according to the present invention.

In this example, a single-panel type liquid crystal projector 110 as in the example of FIG. 1 or FIG. 6 is built in a portable telephone terminal 100 as a liquid crystal projector according to the present invention.

Specifically, the portable telephone terminal 100 is of a folding type such that an opening and closing part 101 provided with a display such as a liquid crystal display, an organic EL display or the like and a receiving speaker can be opened and closed with respect to a base part 102 provided with various keys and a transmitting microphone. For example, the liquid crystal projector 110 is built in a side part of the base part 102 on an opposite side from a side where an antenna 103 is provided.

According to this, image data obtained by a portable telephone communication network or obtained by taking a subject by a camera built in the portable telephone terminal 100 and recorded on a recording medium such as a semiconductor memory or a hard disk built in the portable telephone terminal 100, a memory card loaded in the portable telephone terminal 100, or the like is processed by an image processing unit within the portable telephone terminal 100, and converted into a red, a green, and a blue image signal, which are applied to a liquid crystal display panel 40 of the liquid crystal projector 110. Thereby multi-color image light 7 can be projected onto a screen 200 outside the portable telephone terminal 100.

A wall of a room, the top of a desk, a sheet of paper placed on a desk, and the like can be used as the screen 200.

The liquid crystal projector according to the present invention can be built in not only a portable telephone terminal but also a device that processes image data recorded on a recording medium (storage device) built therein or loaded therein and reproduces an image, such as a digital camera (digital still camera), a video camera, a mobile computer, a game machine or the like.

The invention claimed is:
1. A liquid crystal projector comprising:
  a light source unit having first, second, and third lasers that emit a red laser light beam, a green laser light beam, and a blue laser light beam, respectively, each of the first, second, and third lasers being a semiconductor laser or a solid-state laser;
  a liquid crystal display panel having a liquid crystal layer, including a red pixel, a green pixel, and a blue pixel, between an incidence side substrate and an emission side substrate, and a microlens array made of microlenses on the incidence side substrate;
  a light beam diffusing and shaping optical element that diffuses and shapes the red, green, and blue laser light beams emitted from the light source unit by light diffraction or refraction such that the red, green, and blue laser light beams are each spread over an entire display area of the liquid crystal display panel and are incident on corresponding pixels of the liquid crystal layer of the liquid crystal display panel;
  a lens system that converts the red, green, and blue laser light beams diffused and shaped by the light beam diffusing and shaping optical element into beams of substantially collimated light, and making the substantially collimated beams incident on the microlenses of the liquid crystal display panel; and
  a projection lens that projects image light passed through the liquid crystal display panel,
  wherein,
    an angle of divergence of each of the red, green, and blue laser light beams diffused and shaped by the light beam diffusing and shaping optical element is one degree or smaller, and
    a diameter of each of the red, blue, and green laser light beams incident on the light beam diffusing and shaping optical element is set such as to obtain the angle of divergence of one degree or smaller.

2. The liquid crystal projector according to claim 1, wherein the light source unit makes at least one laser light beam emitted from a respective first, second, or third laser incident on the light beam diffusing and shaping optical element through an optical fiber.

3. The liquid crystal projector according to claim 1, wherein:
the first and third lasers are semiconductor lasers,
the second laser is a solid-state laser, and
the light source unit includes a collimation optical system for making cross-sectional shapes of the laser light beams emitted from the first and third lasers substantially circular and a beam expander for increasing a beam diameter of the laser light beam emitted from the second laser.

4. The liquid crystal projector according to claim 1, wherein:
the first, second, and third lasers are arranged in one direction, and
a prism or another optical means, that brings the laser light beams respectively emitted from two lasers on both sides of one of the first, second, and third lasers that is at a center close to the laser light beam emitted from the laser at the center, is disposed for the two lasers.

5. The liquid crystal projector according to claim 1, wherein:
respective emission surfaces of the first, second, and third lasers are extended or arranged in one direction.

6. The liquid crystal projector according to claim 5, wherein:
the first, second, and third lasers are integrated in one substrate.

7. A liquid crystal projector comprising:
a first laser that emits a first laser light beam of a first color of red, green, or blue, the first laser being a semiconductor laser or a solid-state laser;
a first liquid crystal display panel associated with the first color;
a first light beam diffusing and shaping optical element that diffuses and shapes the first laser light beam emitted from the first laser by light diffraction or refraction such that the first laser light beam is spread over an entire display area of the first liquid crystal display panel;
a first lens system that converts the first laser light beam diffused and shaped by the first light beam diffusing and shaping optical element into a beam of substantially collimated light, and making the beam incident on the first liquid crystal display panel;
second and third lasers that emit second and third laser light beams of a second color and a third color, respectively, the second and third colors being different from each other and from the first color, each of the second and third color being one of red, green, and blue, and each of the second and third lasers being a semiconductor laser or a solid-state laser;
a second liquid crystal display panel having a crystal layer, including pixels corresponding to the second color and the third color, between an incidence side substrate and an emission side substrate, and a microlens array made of microlenses on the incidence side substrate;
a second light beam diffusing and shaping optical element that diffuses and shapes the second and third laser light beams emitted from the second and third lasers by light diffraction or refraction such that the second and third laser light beams are each spread over an entire display area of the second liquid crystal display panel and are incident on corresponding pixels of the liquid crystal layer of the second liquid crystal display panel;
a second lens system that converts the laser light beams of the second color and the third color diffused and shaped by the second light beam diffusing and shaping optical element into beams of substantially collimated light, and making the beams incident on the microlenses of the second liquid crystal display panel;
synthesizing optical means that synthesizes image light of the first color passed through the first liquid crystal display panel and image lights of the second color and the third color passed through the second liquid crystal display panel; and
a projection lens that projects image light from the synthesizing optical means,
wherein,
an angle of divergence of the first laser light beam diffused and shaped by the first light beam diffusing and shaping optical element is one degree or smaller, and
an angle of divergence of each of the second and third laser light beams diffused and shaped by the second light beam diffusing and shaping optical element is one degree or smaller, and
a diameter of each of the first, second, and third laser light beams incident on a respective one of the first and second light beam diffusing and shaping optical elements is set such as to obtain the angle of divergence of one degree or smaller.

8. A liquid crystal projector comprising:
a light source unit having first and second lasers which emit first and second laser light beams of a first color and a second color, respectively, the first color different from the second color, each of the first and second colors being one of red, green, and blue, and each of the first and second lasers being a semiconductor laser or a solid-state laser;
a liquid crystal display panel having a liquid crystal layer, including pixels corresponding to the first color and the second color, between an incidence side substrate and an emission side substrate, and a microlens array made of microlenses on the incidence side substrate;
a light beam diffusing and shaping optical element that diffuses and shapes the first and second laser light beams emitted from the light source unit by light diffraction or refraction such that the first and second laser light beams are each spread over an entire display area of the liquid crystal display panel and are incident on corresponding pixels of the liquid crystal layer of the liquid crystal display panel;
a lens system which converts the first and second laser light beams diffused and shaped by the light beam diffusing and shaping optical element into beams of substantially collimated light, and making the beams incident on said microlenses of said liquid crystal display panel; and
a projection lens for projecting image light passed through said liquid crystal display panel,
wherein,
an angle of divergence of each of the first and second laser light beams diffused and shaped by the light beam diffusing and shaping optical element is one degree or smaller, and
a diameter of each of the first and second laser light beams incident on the light beam diffusing and shaping optical element is set such as to obtain the angle of divergence of one degree or smaller.

9. A liquid crystal projector comprising:
a first laser and a second laser that emit first and second laser light beams of a first color and a second color, respectively, the first color different from the second color, each of the first and second colors being one of red, green, and blue, the first and second lasers being each a semiconductor laser or a solid-state laser;

a first liquid crystal display panel for the first color and a second liquid crystal display panel for the second color, each liquid crystal display panel having a microlens array made of microlenses on a light incident side thereof;

first and second light beam diffusing and shaping optical elements that, respectively, diffuse and shape the first and second laser light beams emitted from the first and second lasers by light diffraction or refraction such that the first and second laser light beams are each spread over an entire display area of a respective liquid crystal display panel;

first and second lens systems that, respectively, convert the first and second laser light beams diffused and shaped by the first and second light beam diffusing and shaping optical elements into beams of substantially collimated light, and making the beams incident on the first and second liquid crystal display panels;

synthesizing optical means that synthesizes image lights of the first color and the second color passed through the first and second liquid crystal display panels; and a projection lens which projects image light from the synthesizing optical means, wherein,
an angle of divergence of each of the first and second laser light beams diffused and shaped respectively by the first and second light beam diffusing and shaping optical elements is one degree or smaller, and
a diameter of each of the first and second laser light beams incident on a respective one of the first and second light beam diffusing and shaping optical elements is set such as to obtain the angle of divergence of one degree or smaller.

10. A liquid crystal projector comprising:

a laser light source that emits a laser light beam, the laser light source being formed of a semiconductor laser or a solid-state laser;

a liquid crystal display panel in which a liquid crystal layer is formed between two substrates, one of the substrates being a light incident substrate, and the panel including a microlens array made of microlenses on a light incident side of the light incident substrate;

a light beam diffusing and shaping optical element that diffuses and shapes the laser light beam emitted from the laser light source by light diffraction or refraction such that the laser light beam is spread over an entire display area of the liquid crystal display panel;

a lens system that converts the laser light beam diffused and shaped by the light beam diffusing and shaping optical element into a beam of substantially collimated light, and making the beam incident on the liquid crystal display panel; and a projection lens which projects image light passed through the liquid crystal display panel, wherein,
an angle of divergence of the laser light beam diffused and shaped by the light beam diffusing and shaping optical element is one degree or smaller, and
a diameter of the laser light beam incident on the light beam diffusing and shaping optical element is set such as to obtain the angle of divergence of one degree or smaller.

11. An image reproducing device including the liquid crystal projector of any one of claims 1 to 7 and 8-10.

* * * * *